US011901605B2

(12) United States Patent
Harvey et al.

(10) Patent No.: US 11,901,605 B2
(45) Date of Patent: *Feb. 13, 2024

(54) DEPLOYABLE ANTENNA STRUCTURE

(71) Applicant: M.M.A. Design, LLC, Louisville, CO (US)

(72) Inventors: Thomas J. Harvey, Nederland, CO (US); Toby J. Harvey, Cedar City, UT (US); Leslie A. Seal, Eldora, CO (US)

(73) Assignee: M.M.A. Design, LLC, Louisville, CO (US)

( * ) Notice: Subject to any disclaimer, the term of this patent is extended or adjusted under 35 U.S.C. 154(b) by 747 days.

This patent is subject to a terminal disclaimer.

(21) Appl. No.: 17/085,601

(22) Filed: Oct. 30, 2020

(65) Prior Publication Data

US 2021/0111476 A1 Apr. 15, 2021

Related U.S. Application Data

(60) Continuation of application No. 16/356,484, filed on Mar. 18, 2019, now Pat. No. 10,826,157, which is a (Continued)

(51) Int. Cl.
*H01Q 1/12* (2006.01)
*H01Q 1/08* (2006.01)
(Continued)

(52) U.S. Cl.
CPC ............ *H01Q 1/1235* (2013.01); *H01Q 1/08* (2013.01); *H01Q 1/28* (2013.01); *H01Q 15/148* (2013.01); *H01Q 15/161* (2013.01); *H01Q 15/20* (2013.01)

(58) Field of Classification Search
None
See application file for complete search history.

(56) References Cited

U.S. PATENT DOCUMENTS 3,010,372 A 11/1961 Lanford
3,599,218 A 8/1971 Williamson
(Continued)

FOREIGN PATENT DOCUMENTS

EP 0957536 A1 11/1999
EP 1043228 B1 3/2003
(Continued)

OTHER PUBLICATIONS

MMA Design LLC "eHaWK 27A-84FV".
(Continued)

*Primary Examiner* — Ab Salam Alkassim, Jr.
(74) *Attorney, Agent, or Firm* — Holzer Patel Drennan

(57) ABSTRACT

The invention is directed to deployable reflectarray antenna structure. In one embodiment, the deployable reflectarray antenna structure includes a pair of flexible electrical elements, a feed antenna, and a deployment mechanism that employs a plurality of tapes to respectively transition the pair of flexible electrical elements from an undeployed state in which the elements are folded towards a deployed state in which the deployment mechanism and electrical elements cooperate to form a reflectarray and a subreflector of a reflectarray antenna structure. Further, the deployment mechanism also operates to position the reflectarray and subreflector relative to one another and to the feed antenna so as to realize a reflectarray antenna structure.

16 Claims, 18 Drawing Sheets

Related U.S. Application Data division of application No. 14/624,549, filed on Feb. 17, 2015, now Pat. No. 10,263,316, which is a continuation-in-part of application No. 14/480,610, filed on Sep. 8, 2014, now abandoned.

(60) Provisional application No. 61/874,519, filed on Sep. 6, 2013.

(51) Int. Cl.

| | |
|---|---|
| ***H01Q 15/16*** | (2006.01) |
| ***H01Q 15/14*** | (2006.01) |
| ***H01Q 15/20*** | (2006.01) |
| ***H01Q 1/28*** | (2006.01) |

(56) References Cited

U.S. PATENT DOCUMENTS

| | | | | |
|---|---|---|---|---|
| 3,905,357 | A | 9/1975 | Ismert | |
| 4,133,501 | A | 1/1979 | Pentlicki | |
| 4,375,878 | A | 3/1983 | Harvey | |
| 4,608,571 | A | 8/1986 | Luly | |
| 5,040,907 | A | 8/1991 | Harvey | |
| 5,189,773 | A | 3/1993 | Harvey | |
| 5,228,644 | A | 7/1993 | Garriott | |
| 5,296,044 | A | 3/1994 | Harvey | |
| 5,298,085 | A | 3/1994 | Harvey | |
| 5,365,241 | A | 11/1994 | Williams | |
| 5,520,747 | A | 5/1996 | Marks | |
| 5,644,322 | A | 7/1997 | Hayes | |
| 5,666,128 | A | 9/1997 | Murray | |
| 5,785,280 | A | 7/1998 | Baghdasarian | |
| 5,977,932 | A | 11/1999 | Robinson | |
| 5,990,851 | A | 11/1999 | Henderson | |
| 6,010,096 | A | 1/2000 | Baghdasarian | |
| 6,017,002 | A | 1/2000 | Burke | |
| 6,081,234 | A | 6/2000 | Huang | |
| 6,217,975 | B1 | 4/2001 | Daton-Lovett | |
| 6,323,827 | B1 * | 11/2001 | Gilger | H01Q 1/08 343/915 |
| 6,340,956 | B1 | 1/2002 | Bowen | |
| 6,384,787 | B1 | 5/2002 | Kim | |
| 6,411,255 | B2 | 6/2002 | Roederer | |
| 6,424,314 | B1 | 7/2002 | Baghdarsarian | |
| 6,581,883 | B2 | 6/2003 | McGee | |
| 6,642,889 | B1 | 11/2003 | McGrath | |
| 6,650,304 | B2 | 11/2003 | Lee | |
| 6,970,143 | B2 | 11/2005 | Allen | |
| 6,983,914 | B2 | 1/2006 | Stribling | |
| 7,030,824 | B1 | 4/2006 | Taft | |
| 7,050,019 | B1 | 5/2006 | Jacomb-Hood | |
| 7,354,033 | B1 | 4/2008 | Murphey | |
| 7,522,116 | B2 | 4/2009 | Balling | |
| 7,595,769 | B2 * | 9/2009 | Bassily | H01Q 15/168 343/915 |
| 7,602,349 | B2 | 10/2009 | Hentosh | |
| 7,714,797 | B2 | 5/2010 | Couchman | |
| 7,782,530 | B1 | 8/2010 | Krumel et al. | |
| 7,856,735 | B2 * | 12/2010 | Allezy | B32B 27/308 33/771 |
| 8,274,443 | B2 | 9/2012 | Hauhe | |
| 8,289,221 | B1 | 10/2012 | Finucane | |
| 8,356,774 | B1 | 1/2013 | Banik | |
| 8,683,755 | B1 | 4/2014 | Spence | |
| 8,720,830 | B1 | 5/2014 | Szatkowski | |
| 8,757,554 | B1 | 6/2014 | Harvey | |
| 8,814,099 | B1 | 8/2014 | Harvey | |
| 8,816,187 | B1 | 8/2014 | Stribling | |
| 8,894,017 | B1 | 11/2014 | Baghdasarian | |
| 9,214,892 | B2 | 12/2015 | White | |
| 9,270,021 | B1 | 2/2016 | Harvey | |
| D756,887 | S | 5/2016 | Filo | |
| 9,528,264 | B2 | 12/2016 | Freebury | |
| 9,550,584 | B1 | 1/2017 | Harvey | |
| 9,593,485 | B2 | 3/2017 | Freebury | |
| 9,605,430 | B2 | 3/2017 | Baudasse | |
| 9,708,080 | B2 | 7/2017 | Judd | |
| 9,718,639 | B2 | 8/2017 | Baudasse | |
| 9,764,857 | B2 | 9/2017 | Baudasse | |
| 9,796,485 | B2 | 10/2017 | Baudasse | |
| 9,825,371 | B2 | 11/2017 | Mayeux | |
| 9,840,060 | B2 | 12/2017 | Francis | |
| 10,119,292 | B1 | 11/2018 | Harvey | |
| 10,170,843 | B2 | 1/2019 | Thomson | |
| 10,211,535 | B2 | 2/2019 | Rahmat-Samii | |
| 10,256,530 | B2 | 4/2019 | Freebury | |
| 10,263,316 | B2 | 4/2019 | Harvey | |
| 10,276,926 | B2 | 4/2019 | Cwik | |
| 10,283,835 | B2 | 5/2019 | Harvey | |
| 10,370,126 | B1 | 8/2019 | Harvey | |
| 10,418,721 | B2 | 9/2019 | Chattopadhyay | |
| 2001/0020914 | A1 | 9/2001 | Roederer | |
| 2002/0050657 | A1 | 5/2002 | Werlen | |
| 2005/0126106 | A1 | 6/2005 | Murphy | |
| 2005/0073467 | A1 | 7/2005 | Kawahara | |
| 2005/0212715 | A1 | 9/2005 | Saunders | |
| 2008/0283670 | A1 | 11/2008 | Harvey | |
| 2008/0290221 | A1 | 11/2008 | Dupuis | |
| 2010/0031525 | A1 * | 2/2010 | Allezy | B32B 27/304 33/771 |
| 2011/0210209 | A1 | 9/2011 | Taylor | |
| 2012/0146880 | A1 | 6/2012 | Behrens | |
| 2012/0235874 | A1 | 9/2012 | Kwak | |
| 2014/0263844 | A1 * | 9/2014 | Cook, Jr. | H02S 30/20 343/705 |
| 2016/0197394 | A1 | 7/2016 | Harvey et al. | |
| 2016/0315393 | A1 | 10/2016 | Mayeux | |
| 2017/0110803 | A1 | 4/2017 | Hodges | |
| 2018/0128419 | A1 | 5/2018 | Brown | |
| 2018/0203225 | A1 | 7/2018 | Freebury | |
| 2018/0244405 | A1 | 8/2018 | Brown | |
| 2018/0254547 | A1 | 9/2018 | Cwik et al. | |
| 2018/0297724 | A1 | 10/2018 | Harvey | |
| 2019/0027835 | A1 | 1/2019 | Hoyt | |
| 2019/0063892 | A1 | 2/2019 | Brown | |
| 2019/0237859 | A1 | 8/2019 | Freebury | |

FOREIGN PATENT DOCUMENTS

| | | | |
|---|---|---|---|
| EP | 3059800 | B1 | 8/2017 |
| WO | 2018005532 | A1 | 1/2018 |
| WO | 2018191427 | A1 | 10/2018 |
| WO | 2019171062 | A1 | 12/2019 |

OTHER PUBLICATIONS

MMA Design LLC "eHaWK 27AS112".
MMA Design LLC "HaWK 17A-42".
MMA Design LLC "HaWK 17AB36".
MMA Design LLC "HaWK 17AS42".
MMA Design "HaWK 17AS56".
MMA Design LLC "T-DaHGR X-Band Antenna for CubeSats—1-meter diametere aperture deployed from 1U", 2019 CubeSat Workshop, Apr. 2019.
MMA Design LLC "Our Missions" https://mmadesignllc.com/about/missions/.
MMA Design LLC "P-DaHGR Antenna" https://mmadesignllc.com/product/p-dahgr-antenna/.
MMA Design LLC "R-DaHGR" https://mmadesignllc.com/product/large-aperture-rigid-array-lara/.
MMA Design LLC "Research Grant Awards" https://mmadesignllc.com/about/research-grant-awards/.
MMA Design LLC "rHaWK Solar Array" https://mmadesignllc.com/product/r-hawk-solar-array/.
MMA Design LLC T-DaHGR Antenna https://mmadesignllc.com/product/t-dahgr-antenna/.
Sheldahl, Product Bulletin, Novaclad G2 300.
Gatti et al., Low Cost Active Scanning Antenna for Mobile Satellite Terminals, University of Perugia, Dept. Electronic and Information Engineering.

(56) References Cited

OTHER PUBLICATIONS

Fang Huang, Analysis and Design of Coplanar Waveguide-Fed Slot Antenna Array, IEEE Transactions on Antennas and Propagation, vol. 47, No. 10, Oct. 1999.
MasterSil 155 Mastere Bond Polymer System, MasterSil 155 Technical Data Sheet.
Eccosorb HR Lightweight, Open-cell, Broadband Microwave Absorber, Laird.
Single Wires ESCC 3901018, Axon Cable & interconnect.
ESCC Cables & harnesses made by AXON, Axon Cable & interconnect.
Rahmat-Samii, Ka Band Highly Constrained Deployable Antenna for RalnCube.
Murphy, Tyler et al., PEZ: Expanding CubeSat Capabilities through Innovative Mechanism Design, 25th Annual AIAA/USU Conference on Small Satellites.
Khayatian, Behrouz et al. "Radiation Characteristics of Reflectarray Antennas: Methodology and Applicatios to Dual Configurations", Jet Propulsion Laboratory.
Fang, Houfei Thermal Distortion Analyses of a Three-Meter Inflatable Reflectarray Antenna, Jet Propulsion Laboratory.
Jones, P. Alan, et al. "Spacecraft Solar Array Technology Trends", AEC-Able Engineering Company, Inc.
Jamaluddin, M.H. et al., "Design, Fabrication and Characterization of a Dielectric Resonator Antenna Reflectarray in Ka-Band", Progress in Electromagnetics Research B, vol. 25, 261-275, 2010.
Mierheim, Olaf, et al. "The Tape Spring Hinge Deployment System of the EU: Cropis Solar Panels", German Aerospace Center DLR.
Ferris et al., The Use, Evolution and Lessons Learnt of Deployable Static Solar Array Mechanisms. Proceedings of the 42nd Aerospace Mechanisms Symposium, NASA Goddard Space Flight Center, May 14-16, 2014.
"DARPA prototype reflectarray antenna offers high performance in small package", PHYSORG, Jan. 23, 2019.
Lele et al., Reflectarray Antennas, International Journal of Computer Applications, vol. 108, No. 3, Dec. 2014.
Cadogan et al., The Development of Inflatable Space Radar Reflectarrays, 40th AIAA/ASME/ASCE/AHS/ASC Structures, Structural Dynamics, and Materials (SDM) Conference, Apr. 12-15, 1999.
Klesh et al., MarCO: CubeSats to Mars in 2016, Jet Propulsion Laboratory, 29th Annual AIAA/USU Conference on Small Satellites.
Huang, John, Capabilities of Print cd Reflectarray Antennas, Jet Propulsion Laboratory, California Institute of Technology.
Huang, John, Review and Design of Printed Reflectarray Antennas, Jet Propulsion Laboratory, California Institute of Technology.
Zawadzki, Mark et al., Integrated RF Antenna and Solar Array for Spacecraft Application, Jet Propulsion Laboratory, California Institute of Technology.
Hand, Thomas, et al., Dual-Band Shared Aperture Reflector/Reflectarray Antenna Designs, Technologies and Demonstrations for NASA's ACE Radar.
Pacheco, Pedro et al., A Non-Explosive Release Device for Aerospace Applications Using Shape Memory Alloys.
Greco, Francesco et al., A Ka-Band Cylindrical Paneled Reflectarray Antenna, Jun. 10, 2019.
Carrasco, Eduardo et al., Reflectarray antennas: A review, Foundation for Research on Information Technologies in Society (IT'IS).
Zuckermandel, J. et al., Design, Build, and Testing of TacSat Thin Film Solar Arrays, MicroSat Systems, Inc., 20th Annual AIAA/USU Conference on Small Satellites.
Filippazzo, Giancarlo et al., The Potential Impact of Small Satellite Radar Constellations on Traditional Space Systems, 5th Federated and Fractionated Satellite Systems Workshop, Nov. 2-3, 2017.
De Boer, GaAs Mixed Signal Multi-Function X-Band Mmic with 7 Bit Phase and Amplitude Control and Integrated Seria to Parallel Converter, TNO Physics and Electronics Laboratory.
Grafmuller, et al., "The TerraSAR-X Antenna System", 2005 IEEE.
Gatti et al., Computation of Gain, Noise Figure, and Third-Order Intercept of Active Array Antennas. IEEE Transactions on Antennas and Propagation, vol. 52, No. 11, Nov. 2004.
Moreira, TerraSAR-X Upgrade to a Fully Polarimetric Imaging Mode. German Aerospace Center (DLR), Jan. 16, 2003.
Smith et al., Coplanar Waveguide Feed for Microstrip Patch Antennas. Electronics Letters, vol. 28, No. 25. Dec. 3, 1992.
Gatti et al., A Novel Phase-Only Method for Shaped Beam Synthesis and Adaptive Nulling. University of Perugia, Dept. Electronic and Information Engineering.
Mencagli et al., Design of Large MM-Wave Beam-Scanning Reflectarrays. University of Perugia, Dept. Electronic and Information Engineering.
Sorrentino et al., Beam Steering Reflectarrays. University of Perugia.
Kim et al., Spaceborne SAR Antennas for Earth Science.
Marcaccioli et al., Beam Steering MEMS mm-Wave Reflectarrays. University of Perugia, Dept. of Information and Electronic Engineering.
Sorrentino et al., Electronic Reconfigurable MEMS Antennas. University of Perugia, Dept. of Electronic and Information Engineering.
Bachmann et al., TerraSAR-X In-Orbit Antenna Model Verification Results. German Aerospace Center (DLR).
Bialkowski et al., Bandwidth Considerations for a Microstrip Reflectarray. Progress in Electromagnetics Research B, vol. 3, 173-187, 2008.
Mikulas et al., Tension Aligned Deployable Structures for Large 1-D and 2-D Array Applications. 49th AIAA/ASME/ASCE/AHS/ASC Structures, Structural Dynamics and Materials Conference, Apr. 7-10, 2008.
Freeman et al., On the Use of Small Antennas for SAR and SAR Scatterometer Systems.
Gatti et al., Scattering Matrix Approach to the Design of Infinite Planar Reflectarray Antennas. DIEI, University of Perugia.
Ebadi et al., Linear Reflectarray Antenna Design Using 1-bit Digital Phase Shifters. D.I.E.I. University of Perugia.
Ebadi et al., Near Field Focusing in Large Reflectarray Antennas Using 1-bit Digital Phase Shifters. DIEI, University of Perugia.
Sorrentino et al., Recent Advances on Millimetre Wave Reconfigurable Reflectarrays. DIEI, University of Perugia.
Chen et al., Fully Printed Phased-Array Antenna for Space Communications.
Gatti et al., Millimetre Wave Reconfigurable Reflectarrays. RF Microtech, a spin-off of the University of Perugia, c/o DIEI.
Montori et al., Constant-Phase Dual Polarization MEMS-Based Elementary Cell for Electronic Steerable Reflectarrays. University of Perugia, Dept. of Electronic and Information Engineering.
Marcaccioli et al., RF MEMS-Reconfigurable Architectures for Very Large Reflectarray Antennas. Dept. of Electronic and Information Engineering, University of Perugia.
Carrasco et al., Dual-polarization reflectarray elements for Ku-band Tx/Rx portable terminal antenna. RF Microtech.
Mencagli et al., Design and Realization of a MEMS Tuneable Reflectarray for mm-wave Imaging Application. University of Perugia, DIEI.
Younis, et al, A Concept for a High Performance Reflector-Based X-Band SAR. German Aerospace Center (DLR), Microwaves and Radar Institute.
Montori et al., Design and Measurements of a 1-bit Reconfigurable Elementary Cell for Large Electronic Steerable Reflectarrays. Dept. of Electronic and Information Engineering.
Montori et al., 1-bit RF-MEMS-Reconfigurable Elementary Cell for Very Large Reflectarray. Dept. of Electronic and Information Engineering.
Moussessian et al., An Active Membrane Phased Array Radar. Jet Propulsion Laboratory, California Institute of Technology.
Fisher, Phased Array Feeds for Low Noise Reflector Antennas. Electronics Division Internal Report No. 307, Sep. 24, 1996.
Montori et al., Wideband Dual-Polarization Reconfigurable Elementary Cell for Electronic Steerable Reflectarray at Ku- Band. University of Perugia, Dept. of Electronic and Information Engineering.
Gannudi et al., Preliminary Design of Foldable Reconfigurable Reflectarray for Ku-Band Satellit4e Communication. University of Perugia, Dept. of Electronic and Information Engineering.

(56) References Cited

OTHER PUBLICATIONS

Tienda, et al., Dual-Reflectarray Antenna for Bidirectional Satellite Links in Ku-Band. European Conference on Antennas and Propagation, Apr. 11-15, 2011.
Lane et al., Overview of the Innovative Space-Based Radar Antenna Technology Program. Journal of Spacecraft and Rockets. vol. 48, No. 1. Jan.-Feb. 2011.
Devireddy et al., Gain and Bandwidth Limitations of Reflectarrays. Dept. of Eletrical Engineering. ACES Journal, vol. 26, No. 2. Feb. 2011.
Knapp et al., Phase-Tilt Radar Antenna Array. Dept. of Electrical and Computer Engineering, University of Massachusetts.
Moussessian et al., Large Aperture, Scanning, L-Band SAR (Membrane-based Phased Array). 2011 Earth Science Technology Forum.
Arista et al., Reskue Project: Transportable Reflectarray Antenna for Satellite Ku-Band Emergency Communications.
DuPont Kapton, Polyimide Film. General Specifications.
Footdale et al., Static Shape and Modal Testing of a Deployable Tensioned Phased Array Antenna. 53rd AIAA/ASME/ASCE/AHS/ASC Structures, Structural Dynamics and Materials Conference. Apr. 23-26, 2012.
Montori et al., Reconfigurable and Dual-Polarization Folded Reflectarray Antenna. Dept. of Electronic and Information Engineering. University of Perugia.
Zebrowski, Illumination and Spillover Efficiency Calculations for Rectangular Reflectarray Antennas. High Frequency Electronics.
Jeon et al., Structural Determinancy and Design Implications for Tensioned Precision Deployable Structures. 54th AIAA/ASME/ASCE/AHS/ASC Structures, Structural Dynamics, and Materials Conference. Apr. 8-11, 2013.
Bachmann et al., TerraSAR-X Antenna Calibration and Monitoring Based on a Precise Antenna Model.
Hum et al., Reconfigurable Reflectarrays and Array Lenses for Dynamic Antenna Beam Control: A Review. IEEE Transactions on Antennas and Propagation. Aug. 21, 2013.
Todges et al., ISARA Integrated Solar Array Reflectarray Mission Overview. Jet Propulsion Laboratory. California Institute of Technology. Aug. 10, 2013.
Cooley, Michael "Phased Array-Fed Reflector (PAFR) Antenna Architectures for Space-Based Sensors." Northtrop Grumman Electronic Systems. 2015.
FedBizOpps, Cubesat Solar Sail Systems—ManTech/Nexolve. Oct. 25, 2013.
Metzler, Thomas "Design and Analysis of a Microstrip Reflectarray". University of Massachusetts. 1993.
Synak, Aleksander "Erasmus Student Exchange Project: Design and Implementation of UHF Patch Antenna." Universitat Politecnica De Catalunya.
European Search Report for European Patent Appl. No. 16155768.1, dated Jul. 15, 2016.
Focatiis et al . , Deployable Membranes Designed from Folding Tree Leaves , Philosophical Transactions of the Royal Society of London A , 2002 , pp . 1-12 , The Royal Society.
Guest et al . , Inextensional Wrapping of Flat Membranes , Proceedings of the First International Seminar on Structural Morphology ,Sep. 7-11, 1992 , pp. 203-215 .
Im et al . , Prospects of Large Deployable Reflector Antennas for a New Generation of Geostationary Doppler Weather Radar Satellites , AIAA Space 2007 Conference & Exposition , Sep. 18-20, 2007 , pp. 1-11 , American Institute of Aeronautics and Astronautics ,Inc.
Mallikarachchi , Thin-Walled Composite Deployable Booms withTape-Spring Hinges , May 2011 , pp . 1-181 , University of Cambridge.
Thomson , Mechanical vs . Inflatable Deployable Structures for Large Apertures or Still No Simple Answers , Nov. 10-11, 2008 , pp. 1-24, Keck Institute for Space Sciences.
Huang et al . , Reflectarray Antennas , Oct. 2007 , pp. ii-xii , 1-7 , 9-26 , 112-118 , 137-143 , 182-193 and 201 205.
Arya, Wrapping Thick Membranes with Slipping Folds, American Institute of Aeronautics and Astronautics, California Institute of Technology.
Biddy et al., LightSail-1 Solar Sail Design and Qualification, May 2012, pp. 451-463, Proceedings of the 41st Aerospace Mechanisms Symposium, Jet Propulsion Laboratory.
John Wiley & Sons , Inc .CubeSat Design Specification Rev 13 , Feb. 20, 2014 , pp. 1-42 ,California Polytechnic State University.
Cesar-Auguste et al., An Investigation of Germanium Coated Black Kapton and Upilex Films under Different Environmental Ground Conditions, ESA-ESTEC, Materials Technology Section, The Netherlands.
Dearborn et al., A Deployable Membrane Telescope Payload for CubeSats, JoSS, vol. 3, No. 1., pp. 253-264.
Demaine, Geometric Folding Algorithms: Linkages, Origami, Polyhedra, Fall 2010.
Demaine et al., Geometric Folding Algorithms, Feb. 2007.
Fang, et al., In-Space Deployable Reflectarray Antenna: Current and Future, American Institute of Aeronautics and Astronautics.
Kelly, A Scalable Deployable High Gain Antenna-DaHGR, 30th Annual AIAA/USU, Conference on Small Satellites.
Kiziah et al., Air Force Academy Department of Physics Space Technologies Development and Research, May 2014, 30th Space Symposium.
Leipold et al., Large SAR Membrane Antennas with Lightweight Deployable Booms, Jun. 2005, 28th ESA Antenna Workshop on Space Antenna Systems and Technologies.
Shaker et al., Reflectarray Antennas Analysis, Design, Fabrication, and Measurement, Book, 2014, Artech House.
Stella et al., Current Results From the Advanced Photovoltaic Solar Array (APSA) Program.
Straubel, Design and Sizing Method for Deployable Space Antennas, Dissertation, Jul. 2012.
Su et al., Wrinkling Analysis of a Kapton Square Membrane under Tensile Loading, Apr. 2003.
Triolo, NASA Technical Reports Server (NTRS) 20150017719: Thermal Coatings Seminar Series Training Part 2: Environmental Effects, Aug. 2015.
Huang, The Development of Inflatable Array Antennas, Jet Propulsion Laboratory, California Institute of Technology.
Huang et al., Inflatable Microstrip Reflectarray Antennas at X and Ka-band Frequencies, Jul. 1999.
Huang et al., A One-Meter X-Band Inflatable Reflectarray Antenna, Jet Propulsion Laboratory, California Institute of Technology.
Integrated Solar Array and Reflectarray Antenna (ISARA), National Aeronautics and Space Admnistration (NASA), May 3, 2013.
MacGillivray, Charles, "Miniature Deployable High Gain Antenna for CubeSats", Apr. 2011.
Military Specification (MIL)-A-83577B (USAF), Assemblies, Moving Mechanical, for Space and Launch Vehicles, General Specification for (DOD, Mar. 15, 1978).
TRW Engineering & Test Division, (1990) Advanced Photovoltaic Solar Array Prototype . Fabrication, Phase IIB, JPL Contract No. 957990 (Mod 6), TRW Report No. 51760-6003-UT-00.
"Capella Space closes $19M Series B to deliver reliable Earth Observation data on demand", Capella Space, Sep. 26, 2018.
"Capella Space", GlobalSecurity.org, https://www.globalsecurity.org/space/systems/capella.htm.
Fernholz, Tim, "Silicon Valley is investing $19 million in space radar", Quartz, Sep. 29, 2018.
Werner, Debra "Capella's First Satellite launching this fall", Spacenews, Aug. 8, 2018.
Capella Space is First American Company to Send Advanced Commercial Radar Satellite to Space, Markets Insider, Dec. 3, 2018.
"Capella X-SAR (Synthetic Aperture Radar) Constellation", eoPortal Directory.
Banazedehm, Payam "Prepare to Launch [Entire Talk]", Stanford eCorner, Aug. 5, 2019.
Kamra, Deepak "Capella Space—Getting the Full Picture", Canaan, Jan. 7, 2017.
"Capella Space Corporation—Testing the First Commercial U.S. SAR Satellite".
Werner, Debra "Capella Space gets ready for primetime as constellation operator", Spacenews, Jun. 3, 2019.
Capella Space "The Capella 36".

(56) References Cited

OTHER PUBLICATIONS

MMA Design LLC "Another MMA HaWk Takes Flight" https://mmadesignllc.com/2019/05/sparc-1-hawks-take-flight/.
MMA Design LLC "FalconSAT-7 Finally Earns its Wings!" https://mmadesign.com/2019/07/falconsat-7-finally-earns-its-wings/.
MMA Design LLC "Customize Your HaWK" https://mmadesignllc.com/customize-your-hawk/.
MMA Design LLC "ASTERIA'S HaWK solar arrays successfully deploy in space!" https://mmadesignllc.com/2018/01/asteria-hawk-deploys-in-space/.
MMA Design LLC "MarCO HaWKs Headed to Mars!" https://mmadesignllc.com/2018/05/marco-mission-hawks-poised-for-launch-2/.
MMA Design LLC "JPL's ASTERIA wins SmallSat Mission of the Year!" https.
MMA Design LLC "MarCO Mission HaWKs poised for launch!" https://mmadesignllc.com/2018/04/marco-mission-hawks-poised-for-launch/.
MMA Design LLC "MarCO Mission's twin CubeSats rule the headlines" https://mmadesignllc.com/2018/11/marco-rules-the-headlines/.
MMA Design LLC "MMA Solar Arrays Launch on ASTERIA CubeSat!" https://mmadesignllc.com/2017/08/asteria-launch/.
Warren et al., Large, Deployable S-Band Antenna for a 6U Cubesat. 29th Annual AIAA/USU Conference on Small Satellites.
Sauder et al., Ultra-Compact Ka-Band Parabolic Deployable Antenna for RADAR and Interplanetary CubeSats. 29th Annual AIAA/USU Conference on Small Satellites.
Kelly, A Scalable Deployable High Gain Reflectarray Antenna—DaHGR. MMA Design LLC.
Montori et al., A Transportable Reflectarray Antenna for Satelitte Ku-Band Emergency Communications. IEEE Transactions on Antennas and Propagation. vol. 63, No. 4, Apr. 2015.
Larranaga et al., On the Added Value of Quad-Pol Data in a Multi-Temporal Crop Classification Framework Based on RADARSAT-2 Imagery. Remote Sens. 2016, 8, 335.
Petkov et al., Charge Dissipation in Germanium-Coated Kapton Films at Cryogenic Temperatures. Jet Propulsion Laboratory. California Institute of Technology.
Sheldahl, Product Bulletin, Germanium Coated Polyimide.
Medina-Sanchez, Rafael "Beam Steering Control System for Low-Cost Phased Array Weather Radars: Design and Calibration Techniques". Doctoral Dissertations. University of Massachusetts. May 2014.
Eom et al., A Cylindrical Shaped-Reflector Antenna with a Linear Feed Array for Shaping Complex Beam Patterns. Progress in Electromagnetics Research. vol. 119, 477-495, 2011.
Lenz et al., Highly Integrated X-band Microwave Modules for the TerraSAR-X Calibrator.
Kumar et al., Design of a Wideband Reduced Size Microstrip Antenna in VHF/Lower UHF Range.
Giauffret et al., Backing of Microstrip Patch Antennas Fed by Coplanar Waveguides. 26th EuMC, Sep. 9-12, 1996.
Salazar et al., Phase-Tilt Array Antenna Design for Dense Distributed Radar Networks for Weather Sensing. IGARRS 2008.
Gatti et al., Slotted Waveguide Antennas with Arbitrary Radiation Pattern. University of Perugia.
Huber et al., Spaceborne Reflector SAR Systems with Digital Beamforming. IEE Transactions on Aerospace and Electronic Systems. vol. 48, No. 4. Oct. 2012.
Mejia-Ariza et al., "Ultra-Flexible Advanced Stiffness Truss (U-FAST)" AIAA SciTech Fourm. Jan. 4-8, 2016.
Rogers Corporation, Copper Foils for High Frequency Materials.
Younis et al., Performance Comparision of Reflector-and Planar-Ant4enna Based Digital Beam-Forming SAR. International Journal of Antennas and Propagation. vol. 2009.
Montori et al., Novel 1-bit Elementary Cell for Reconfigurable Reflectarray Antennas. Dept. of Electronic and Information Engineering. University of Perugia.
Gatti, Roberto "Pubblicazioni Reflectarrays".
Montori et al., W-band beam-steerable MEMS-based reflectarray. International Journal of Microwave and Wireless Technologies. Jul. 15, 2011.
Pehrson et al., Folding Approaches for Tensioned Precision Planar Shell Structures. AIAA SciTech Fourm. 2018 AIAA Spacecraft Structures Conference. Jan. 8-12, 2018.
Greschik et al., Error Control via Tension for an Array of Flexible Square Antenna Panels. 51st AIAA/ASME/ASCE/AHS/ASC Structures, Structural Dynamics, and Materials Conference. Apr. 12-16, 2010.
Greschik et al., Strip Antenna Figure Errors Due to Support Truss Member Length Imperfections. 45th AIAA/ASME/ASCE/AHS/ASC Structures, Structural Dynamics and Materials Conference. Apr. 19-22, 2004.
DuPont Kapton 200EN Polyimide Film, 50 Micron Thickness. http://www.matweb.com/search/datasheet_print.aspx?matguid=305905ff1ded40fdaa34a18d8727a4dc.
CubeSat Design Specification Rev 13 , Feb. 20, 2014 , pp. 1-42 , California Polytechnic State University .
Defocastiis et al . , Deployable Membranes Designed from Folding Tree Leaves , Philosophical Transactions of the Royal Society of London A , 2002 , pp. 1-12 , The Royal Society .
Huang et al . , Reflectarray Antennas , Oct. 2007 , pp. ii-xii , 1-7 , 9-26 , 112-118 , 137-143 , 182-193 and 201-205 , John Wiley & Sons , Inc.
Cassini Program Environmental Impact Statement Supporting Study, vol. 2: Alternate Mission and Power Study. Jet Propulsion Laboratory, California Institute of Technology, Jul. 1994.
Military Specification. Assemblies, Moving Mechanical, for Space and Launch Vehicles, General Specification for. Apr. 18, 1988.
Dearborn, Michael et al., A Deployable Membrane Telescope Payload for CubeSats. JoSS, vol. 3, No. 1, pp. 253-264.
Engberg, Brian et al., A High Stiffness Boom to Increase the Moment-ARM for a Propulsive Attitude Control System on FalconSat-3. 17th Annual AIAA/USU Conference on Small Satellites. 2003.
Arya, Manan, Wrapping Thick Membranes with Slipping Folds. California Institute of Technology. American Institute of Aeronautics and Astronautics. 2015.
Guest, S.D., et al., Inextensional Wrapping of Flat Membranes. Department of Engineering, University of Cambridge. 1992.
Luo, Qi, et al., Design and Analysis of a Reflectarray Using Slot Antenna Elements for Ka-band SatCom. IEEE Transactions on Antennas and Propagation, vol. 63, No. 4. Apr. 2015.
Leipold, M. et al., Large SAR Membrane Antennas with Lightweight Deployable Booms. 28th ESA Antenna Workshop on Space Antenna Systems and Technologies, ESA/ESTEC, May 31-Jun. 3, 2005.
Fang, Houfei, et al., In-Space Deployable Reflectarray Antenna: Current and Future. American Institute of Aeronautics and Astronautics. 2008.
Rauschenbach, H.S. et al., Solar Cell Array Design Handbook. vol. 1. Jet Propulsion Laboratory. California Institute of Technology. Oct. 1976.
Triolo, Jack, Thermal Coatings Seminar Series Training. Part 1: Properties of Thermal Coatings. NASA GSFC Contamination and Coatings Branch—Code 546. Aug. 6, 2015.
Huang, John, et al., A 1-m X-band Inflatable Reflectarray Antenna. Jet Propulsion Laboratory. California Institute of Technology. Jun. 24, 1998.
Belvin, W., et al., Advanced Deployable Structural Systems for Small Satellites. Sep. 2016.
Cesar-Auguste, Virginie, et al., An Investigation of Germanium Coated Black Kapton and Upilex Films Under Different Environmental Ground Conditions. 2009.
Pacette, Paul E. et al., A Novel Reflector/Reflectarry Antenna. An Enabling Technology for NASA's Dual-Frequency ACE Radar. Jun. 14, 2012.
Liu, ZhiQuan, et al., Review of Large Spacecraft Deployable Membrane Antenna Structures. Feb. 28, 2017.
Sheldahl A Multek Brand, The Red Book. 2019.
EoPortal Directory, FalconSat-7. Satellite Missions. https://directory.eoportal.org/web/eoportal/satellite-missions/f/falconsat-7. 2020.

(56) References Cited

OTHER PUBLICATIONS

Finckenor, Miria et al., Results of International Space Station Vehicle Materials Exposed on MISSE-7B. Jun. 27, 2012.
Kurland, Richard et al., Current Results From the Advanced Photovoltaic Solar Array (APSA) Program. Aug. 9, 1993.
Bron Aerotech, Aerospace Material to Spec. 2020.
Straubel, Marco, Design and Sizing Method for Deployable Space Antennas, Dissertation. Jul. 2, 2012.
Biddy, Chris et al., LightSail-1 Solar Sail Design and Qualification. 41st Aerospace Mechanisms Symposium, Jet Propulsion Laboratory, May 16-18, 2012.
Murphey, Thomas W. et al., Tensioned Precision Structures. Air Force Research Laboratory. Jul. 24, 2013.
Kiziah, Rex, et al., Air Force Academy Department of Physics Space Technologies Development and Research. 30th Space Symposium, Technical Track, May 21, 2014.
Smith, Brian FalconSAT-7 Deployable Solar Telescope. United States Air Force Academy. Space Physics and Atmospheric Research Center. Aug. 5, 2014.
Dearborn, Michael et al., A Deployable Membrane Telescope Payload for CubeSats. JoSS, vol. 3, No. 1, pp. 253-264. 2014.
Sheldahl A Multek Brand, Product Bulletin. Germanium Coated Polyimide. 2020.
P. Keith Kelly, A Scalable Deployable High Gain Antenna—DaHGR. 30th Annual AIAA/USU Conference on Small Satellites. 2016.
P. Keith Kelly, A Scalable Deployable High Gain Antenna—DaHGR. Powerpoint. 2016.
Mooney, C. et al., STAMET—A Materials Investigation. CNES. 2020.
Su Xiaofeng, et al., Wrinkling Analysis of a Kapton Square Membrane under Tensile Loading. 44th AIAA/ASME/ASCE/AHS Structures, Structural Dynamics, and Materials Conference. Apr. 7-10, 2003.
Huang, John et al., Reflectarry Antennas. IEEE Press. 2008.

* cited by examiner

DEPLOYABLE ANTENNA STRUCTURE

RELATED APPLICATIONS

This application is a continuation of U.S. application Ser. No. 16/356,484, filed Mar. 18, 2019, which is a divisional of U.S. application Ser. No. 14/624,549 filed on Feb. 17, 2015, which is a continuation-in-part of U.S. application Ser. No. 14/480,610 filed on Sep. 8, 2014, which claims the benefit of U.S. Application No. 61/874,519 filed on Sep. 6, 2013, the entirety of which is incorporated herein by reference.

FIELD OF THE INVENTION

The invention relates to a deployable antenna structure and, more specifically, to a deployable reflectarray antenna structure.

BACKGROUND OF THE INVENTION

In applications requiring a high-gain antenna, there are at least three types of antennas that are typically employed, namely, a parabolic antenna, phased-array antenna, and a reflectarray antenna. The basic parabolic antenna includes a parabolic shaped reflector and a feed antenna located at the focus of the paraboloid and directed towards the reflector. The phased-array antenna includes multiple antennas with a feed network that provides a common signal to each of the antennas but with the relative phase of the common signal being fed to each of the antennas established such that the collective radiation pattern produced by the array of antennas is reinforced in one direction and suppressed in other directions, i.e., the beam is highly directional. In many applications, the phased-array antenna is preferred to the parabolic antenna because a phased-array antenna can be realized with a lower height profile relative to the parabolic antenna. However, the phased-array antenna typically requires a complicated and/or expensive feed network and amplifier structures. The basic reflectarray antenna includes a reflectarray that is flat or somewhat curved and a feed antenna directed towards the reflectarray. The reflectarray includes an array of radiating elements that each receive a signal from the feed antenna and reradiate the signal. Each of the radiating elements has a phase delay such that the collective reradiated signal produced by the array of radiating elements is in a desired direction. Importantly, the radiating elements are fed by the feed antenna. As such, relative to the phased-arrayed antenna, the reflectarray avoids the need for a feed network to provide a signal to each of the radiating elements.

An application that frequently requires a high-gain antenna is a space-related application in which the antenna is associated with a spacecraft, e.g., a communication satellite. Such space-related applications typically impose an additional requirement of deployability on the design of a high-gain antenna, i.e., the antenna needs to be able to transition from a stowed/undeployed state in which the antenna is inoperable or marginally operable to unstowed/deployed state in which the antenna is operable. As such, the high-gain antenna in these applications is coupled with a deployment mechanism that is used to transition the antenna from the stowed/undeployed state to the unstowed/deployed state. Characteristic of many space-related applications for such antennas is that the antenna and deployment mechanism occupy a small volume in the undeployed state relative to the volume occupied by the antenna and deployment mechanism in the deployed state.

One approach for realizing a deployable high-gain antenna suitable for use on a spacecraft is a parabolic antenna structure that includes a wire mesh reflector, a feed antenna, and a deployment mechanism. The deployment mechanism operates to transition: (a) the wire mesh reflector from a stowed state in which the reflector is folded to an unstowed state in which the reflector is supported in a paraboloid-like shape by a frame associated with the deployment mechanism and (b) the wire mesh reflector and the feed antenna from an inoperable stowed state in which the wire mesh reflector and feed antenna are not operably positioned relative to one another to an unstowed state in which the wire mesh reflector and feed antenna are operatively positioned relative to one another. Characteristic of such deployable parabolic antenna structures is a high part count and the need for a relatively large volume to accommodate the stowed wire mesh reflector, feed antenna, and deployment mechanism.

A second approach for realizing a deployable high-gain antenna suitable for use on a spacecraft is a reflectarray antenna structure that includes a two-layer reflectarray membrane, a feed antenna, and an inflatable deployment mechanism. The inflatable deployment mechanism operates to transition: (a) the reflectarray membrane from a stowed state in which the membrane is folded to an unstowed state in which the inflated deployment mechanism forms a frame that is used in tensioning the reflectarray membrane into a flat shape, similar to trampoline and (b) the reflectarray membrane and the feed antenna from an inoperable stowed state in which the reflectarray membrane and feed antenna are not operably positioned with respect to one another to an unstowed state in which the reflectarray membrane and the feed antenna are operably positioned relative to one another. Characteristic of such a deployable reflectarray are difficulties in understanding the deployment kinematics and reliability challenges, particularly in space-based applications.

SUMMARY OF THE INVENTION

A deployable reflectarray antenna structure is provided that is suitable for use in applications in which elements that are used to form the reflectarray antenna structure need to transition from an undeployed state in which the elements conform to a particular volume in which the elements are not situated so as to function in a reflectarray antenna structure to a deployed state in which the elements are situated so as to function in a reflectarray antenna structure. One such application for a deployable reflectarray antenna structure is as part of a space vehicle, (e.g., a communication satellite) in which elements of the structure typically need to conform to a compact or dimensionally constrained volume for at least a portion of the launch of the space vehicle and then be deployed from the compact or dimensionally constrained space so as to form a reflectarray antenna structure that typically occupies a considerably greater volume.

In one embodiment, the deployable reflectarray antenna structure includes a pair of electrical elements and a deployment mechanism for transitioning the pair of electrical elements from an undeployed state in which the electrical elements are not positioned relative to one another to function in a reflectarray antenna towards a deployed state in which the electrical elements are positioned relative to one another to function in a reflectarray antenna. To facilitate the transition of the electrical elements from the undeployed state towards the deployed state, a tape is employed in which one end of the tape is operatively connected to one of the electrical elements. In operation, the tape transitions from undeployed state in which the ends of the tape are relatively close to one another to a deployed state in which the ends of the tape are farther from one another than in the undeployed state. In performing this transition, the end of the tape that is operatively connected to one of the pair of electrical elements facilitates the positioning of the electrical element for use in a reflectarray antenna. To control the transition of the tape between the undeployed and deployed states, the deployment mechanism employs a damper. In a particular embodiment, one of the pair of electrical elements and the deployment mechanism cooperate to establish a reflectarray in a deployed Cassegrain/Gregorian-type reflectarray antenna structure. The other of the pair of electrical elements and the deployment mechanism cooperate to establish a subreflector in the deployed Cassegrain/Gregorian-type reflectarray antenna structure.

In another embodiment, the deployable reflectarray antenna structure includes a pair of electrical elements and a deployment mechanism that employs multiple tapes in transitioning the two electrical elements from an undeployed state towards a deployed state. In the undeployed state, neither of the two electrical elements functions as an element of a reflectarray antenna system. In the deployed state, the two electrical elements and the deployment mechanism cooperate to form two elements of a reflectarray antenna structure. Further, the deployment mechanism functions in the deployed state to establish the necessary positional relationships of the two elements for functioning in a reflectarray antenna structure.

In one embodiment, multiple tapes in the deployed state cooperate with one of the pair of electrical elements to form an element of a reflectarray antenna structure. In this regard, the multiple deployed tapes define a solid shape. In a particular embodiment, the first ends of four tapes define one base of a frustum of a pyramid-like structure, the second ends of the four tapes define the other base of the frustum of a pyramid-like structure, and the substantial portions of the four tapes that are linearly disposed between the first and second ends define the edges of the frustum of a pyramid-like structure.

In another embodiment, multiple tapes in the deployed state form support structures. In a particular embodiment, the first ends of three tapes define one base of a frustum of a tetrahedron-like structure (i.e., a particular type of pyramid), the second ends of the three tapes define the other base of the frustum of a tetrahedron-like structure, and the substantial portions of the three tapes that are linearly disposed between the first and second ends define the edges of the frustum of the tetrahedron-like structure. In yet another embodiment, four tapes in the deployed state define a portion of a queen post like truss. In this regard, two of the deployed tapes form a substantial portion of the tie beam of the queen post like truss and the other two of the deployed tapes form the queen posts of the queen post like truss.

Yet another embodiment of the deployable reflectarray antenna structure includes a pair of flexible electrical elements, a feed antenna, and a deployment mechanism that includes a deployable frame structure. The deployable reflectarray antenna structure also includes a canister that defines an enclosed space for storing the flexible electrical elements, feed antenna, and deployment mechanism, when each such component of the structure is in an undeployed state. The canister includes a door or hatch that, when opened, allows the flexible electrical elements, feed antenna, and deployment mechanism to operate so that the deployable frame structure and pair of flexible electrical elements cooperate to produce a reflectarray and a subreflector of a Cassegrain/Gregorian-type reflectarray antenna with the reflectarray and subreflector appropriately positioned relative to the feed antenna for a Cassegrain/Gregorian-type reflectarray antenna. When the pair of flexible elements, feed antenna, and deployment mechanism are undeployed and situated within the canister, the deployable frame mechanism is located between the pair of flexible electrical elements.

DETAILED DESCRIPTION

Figure 1:
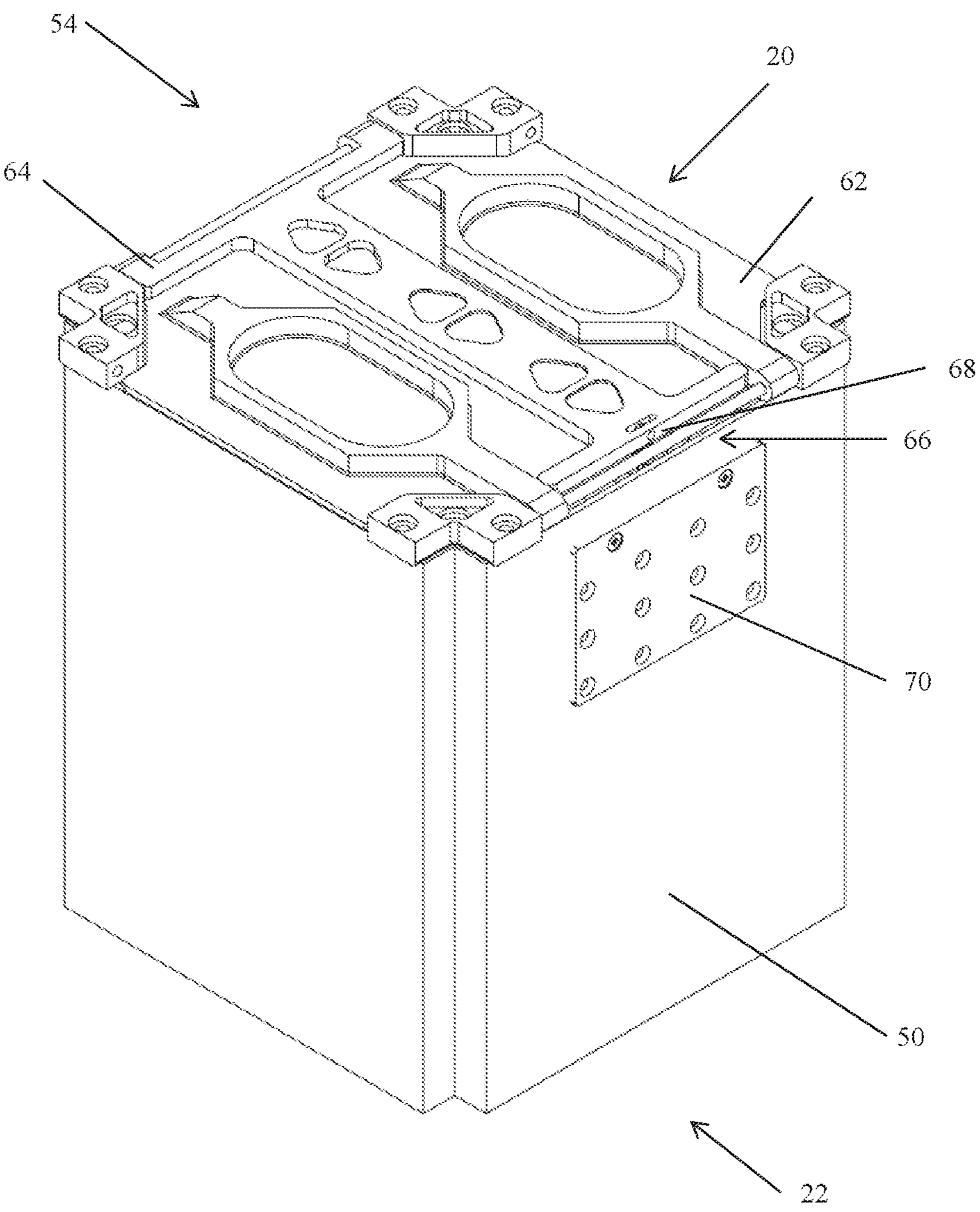
FIG. 1 illustrates an embodiment of the deployable reflectarray antenna structure in an undeployed state.

With reference to FIGS. 1-5 and 18A-18D, an embodiment of a deployable reflectarray antenna structure 20

(hereinafter referred to as "the deployable reflectarray 20") is described. The deployable reflectarray 20 conforms to the CubeSat design specification. More specifically, the deployable reflectarray 20 conforms to a 1U CubeSat design specification, which requires the deployable reflectarray 20 be embodied within a cube that is 10 cm on a side and has a mass of no more than 1.33 kg. Although the deployable reflectarray 20 conforms to the CubeSat 1U design specification, it should be appreciated that adaptation to other form factors and mass requirements is feasible.

The deployable reflectarray 20 includes a canister 22, a feed antenna 24, a first flexible electrical element 26, a second flexible electrical element 28, and a deployment mechanism 30. Generally, the canister 22 stores the feed antenna 24, first and second flexible electrical elements 26, 28 and the deployment mechanism 30 in an undeployed state and provides a base for supporting the feed antenna 24, first and second flexible elements 26, 28 and the deployment mechanism 30 in the deployed state. In the undeployed state, the feed antenna 24 is disposed within a particular volume within the canister 22. Additionally, the first and second flexible electrical elements 26, 28 are folded so as to conform to particular volumes within the canister 22. In the deployed state, the feed antenna 24 and the first and second flexible electrical elements 26, 28 are supported in a center-fed Cassegrain/Gregorian-style reflectarray antenna configuration. More specifically, the deployment mechanism 30 respectively supports the first flexible electrical element 26 so as to form a primary reflectarray 40 and the second flexible electrical element 28 so as to form a secondary reflectarray 42 (reflectarray subreflector) in the configuration. Further, the deployment mechanism 30 positions the feed antenna 24, primary reflectarray 40, and secondary reflectarray 42 relative to one another to realize the noted configuration. In this regard, the feed antenna 24, primary reflectarray 40, and secondary reflectarray 42 are disposed along a center-line 44.

Figure 2:
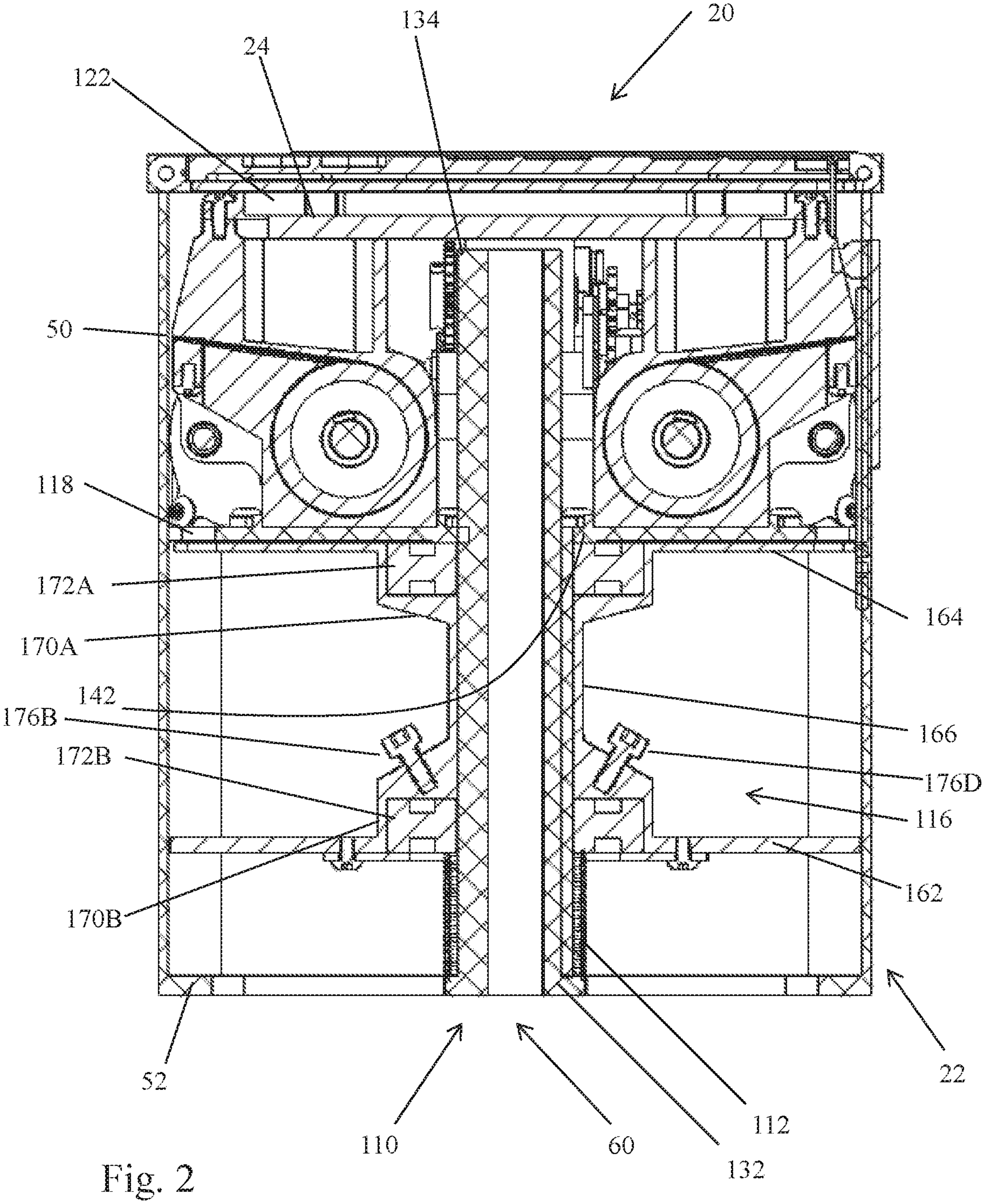
FIG. 2 is a cross-sectional view of the deployable reflectarray antenna structure shown in FIG. 1 in the undeployed state.

With reference to FIGS. 1 and 2, the canister 22 generally is comprised of a tubular side surface 50, a bottom surface 52 that extends across one end of the tubular side surface 50, and door structure 54 that extends across the other end of the tubular side surface 50. The tubular side surface 50 includes four planar side surfaces 56A-56D and four inside corner surfaces 58A-58D that each engages the lateral edges of two adjacent planar side surfaces. Each of the inside corner surfaces accommodates a square rod (not shown) that is part of the CubeSat design specification. The bottom surface 52 is planar and defines at least one hole or passageway 60 that accommodates a coaxial cable (not shown) which allows electrical signals to be communicated to and/or from the feed antenna 24. The door structure 54 includes a first hinged door 62 that is spring-biased towards an open position and a second hinged door 64 that is also spring-biased towards an open position. Associated with the door structure 54 is a latch mechanism 66 that holds the first and second hinged doors 62, 64 is a closed/undeployed state and can be released so as to allow the first and second hinged doors 62, 64 to each rotate towards an open or deployed position. In the illustrated embodiment, the latch mechanism 66 includes a meltable pin 68 that engages the second hinged door 64 to hold the doors in the closed/undeployed state. Associated with the canister 22 is a control board 70 that is used to apply an electrical current to the meltable pin 68 via wires (not shown) that causes the pin to melt so that the first and second hinged doors 62, 64 can each rotate towards the open/deployed position.

The feed antenna 24 is an antenna that is capable of feeding the secondary reflectarray 42 when the deployable reflectarray antenna structure 20 is in the deployed state. In the illustrated embodiment, the feed antenna 24 is a low-profile phased array antenna. In other embodiments, a horn antenna is employed for the feed antenna.

Figure 4A:
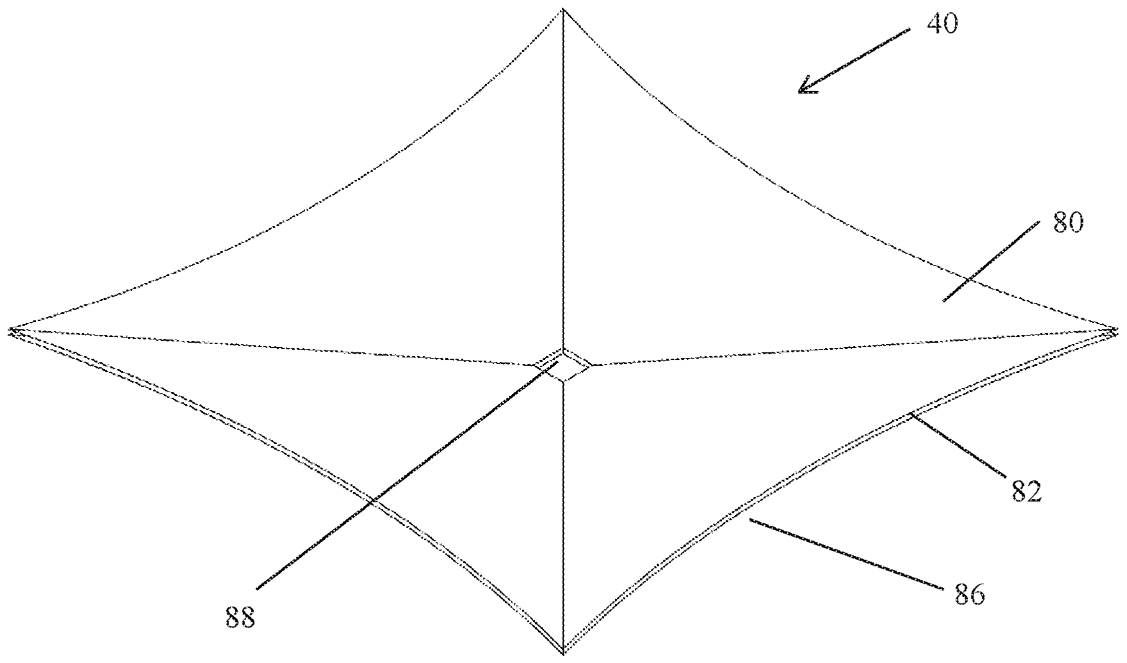
FIGS. 4A and 4B respectively are a perspective view and side view of the reflectarray of the deployable reflectarray antenna shown in FIG. 1.
Figure 4B:
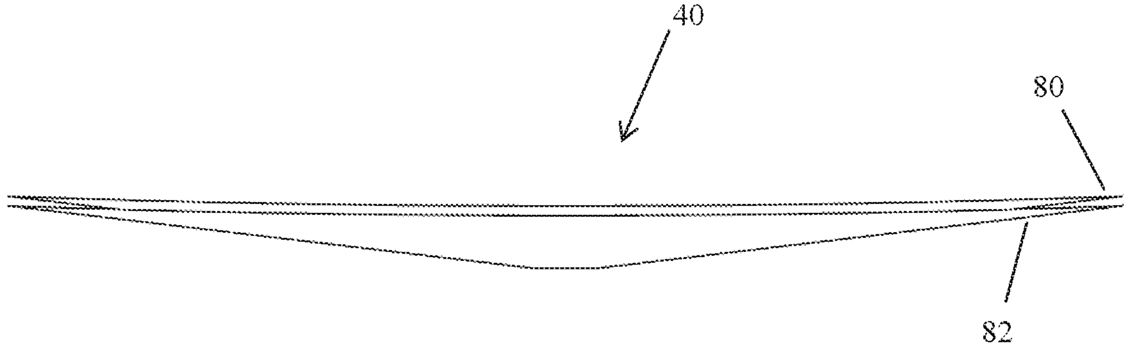

With reference to FIGS. 4A and 4B, the first flexible electrical element 26 is comprised of (a) a first flexible membrane 80 that supports an array of reflectarray elements and (b) a second flexible membrane 82 that serves as a ground plane in the deployed state. A compressible and flexible dielectric structure is located between the first and second flexible membranes and operates to maintain a desired spacing between the first and second flexible membranes when the first flexible electrical element 26 is deployed as the primary reflectarray 40. Generally, the first flexible electrical element 26 has an outer edge 86 that defines a substantially square shape with catenary-shaped edges when the element is in the deployed state. The flexible element 26 also has an inner edge 88 that defines a hole which accommodates a portion of the deployment mechanism 30. The flexible characteristics of the first and second flexible membranes 80, 82 and the compressible and flexible nature of the dielectric structure allow the first flexible electrical element 26 to be folded so as to fit within a specified volume within the canister 22 when the element is in the undeployed state. When the first flexible electrical element 26 is in the deployed state, i.e., forming the primary reflectarray 40, the first flexible electrical element 26 generally defines a frustum of a pyramid in which the outer edge 86 defines a substantially square base of a pyramid-like structure and the inner edge defines a flattened apex of the pyramid-like structure. In other embodiments, the first flexible electrical element in the deployed state is in the form of: a substantially flat square. It should be appreciated that the first flexible electrical element is not limited to having an outer edge that takes on a square shape when the element is in the deployed state. For example, other polygon shapes (e.g., triangles), curved shapes (e.g., circles), and shapes comprised of curved and straight sections are feasible. In the case of the deployable reflectarray 20, the square characteristic of the outer edge 86 of the first flexible electrical element 26 substantially conforms to the square/cubic nature of the canister 22. Other applications may more naturally lend themselves to a first flexible electrical element having a different deployed shape. For instance, a cylindrical volume for storing a first flexible electrical element may suggest an element with an outer edge that is circular in the deployed state.

Figure 5:
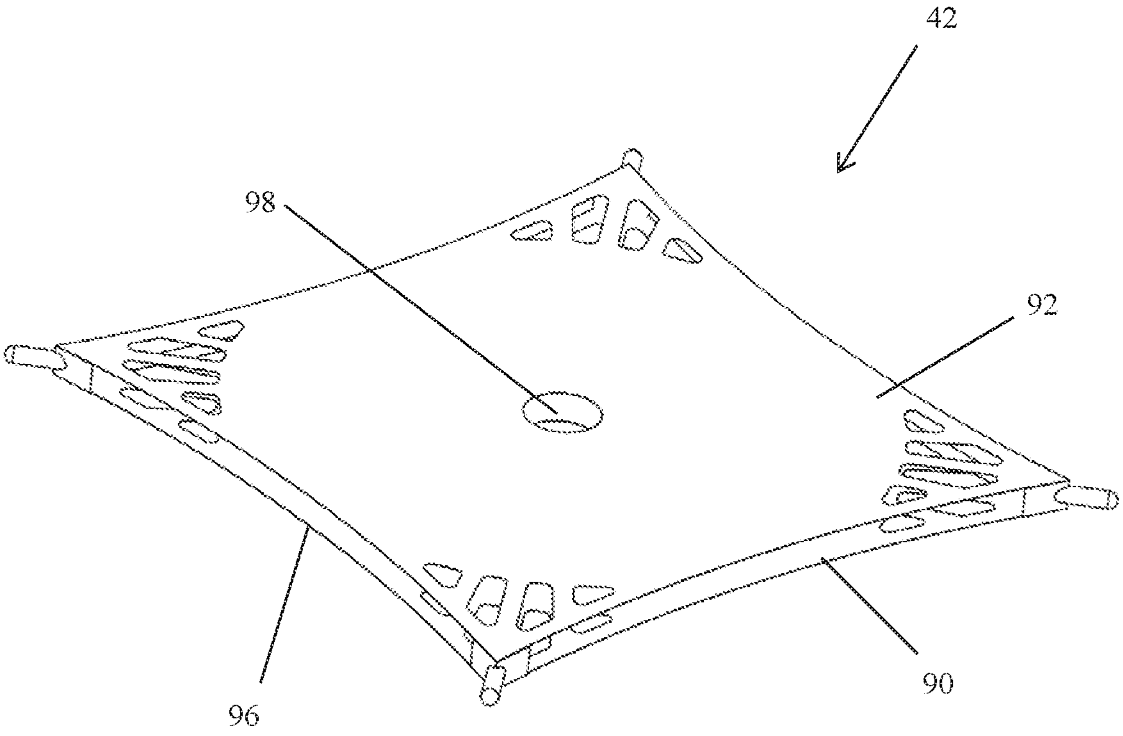
FIG. 5 is a perspective view of the subreflector of the deployable reflectarray antenna shown in FIG. 1.

With reference to FIG. 5, the second flexible electrical element 28 is comprised of (a) a first flexible membrane 90 that supports an array of reflectarray elements and (b) a second flexible membrane 92 that serves as a ground plane in the deployed state. A compressible and flexible dielectric structure is located between the first and second flexible membranes and operates to maintain a desired spacing between the first and second flexible membranes when the second flexible electrical element 28 is deployed as the secondary reflectarray 42. Generally, the second flexible electrical element 28 has an outer edge 96 that defines a substantially square shape with catenary-shaped edges when the element is in the deployed state. The flexible element 28 also has an inner edge 98 that defines a hole. The flexible characteristics of the first and second flexible membranes 90, 92 and the compressible and flexible nature of the dielectric structure allow the second flexible electrical element 28 to be folded so as to fit within a specified volume of the canister 22 when the element is in the undeployed state. When the second flexible electrical element 28 is in the deployed state, i.e., forming the secondary reflectarray 42, the second flexible electrical element 28 is generally planar and the outer edge 96 generally defines a square. It should be appreciated that the second flexible electrical element is not limited to having an outer edge that takes on a square shape when the element is in the deployed state. For example, other polygon shapes (e.g., triangles), curved shapes (e.g., circles), and shapes comprised of curved and straight sections are feasible. Additionally, in other embodiments, the second flexible electrical element can be a reflector or polarizer, as opposed to a reflectarray subreflector.

Figure 3:
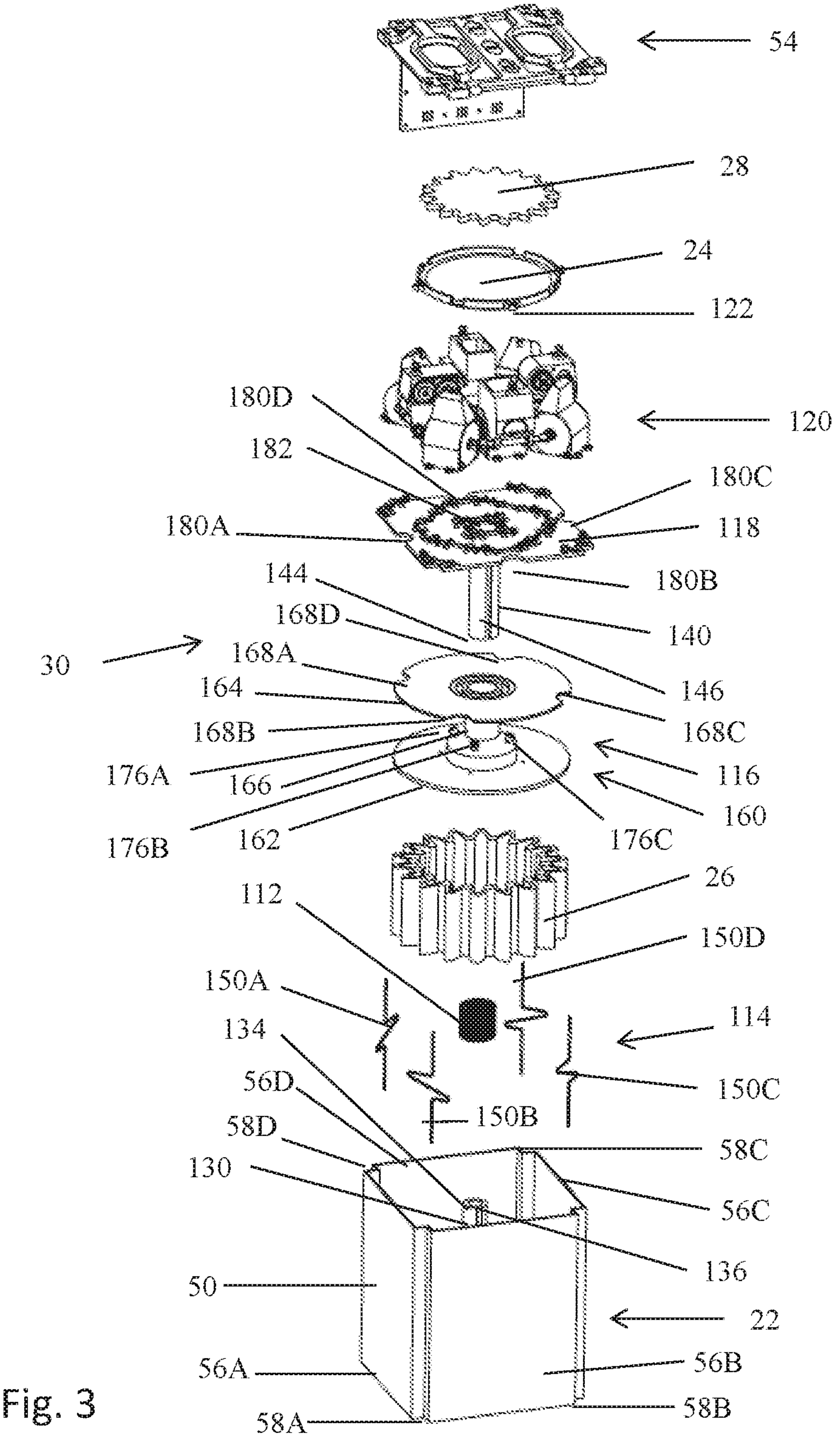
FIG. 3 is an exploded view of the deployable reflectarray antenna structure shown in FIG. 1 in the undeployed state.

With reference to FIGS. 2 and 3, the deployment mechanism 30 operates to transition the deployable reflectarray 20 between an undeployed state and a deployed state. In the undeployed state, the feed antenna 24, first flexible electrical element 26, second flexible electrical element 28, and the deployment mechanism 30 are disposed within the enclosed space defined by the canister 22 when the first and second hinged doors 62, 64 are closed. In the deployed state, the first and second flexible electrical elements 26, 28 are supported so as to respectively form the primary and secondary reflectarrays 40, 42 in a center-fed Cassegrain/Gregorian-style reflectarray antenna. Further, the feed antenna 24, primary reflectarray 40, and secondary reflectarray 42 are located with respect to one another so as to implement a center-fed Cassegrain/Gregorian-style reflectarray antenna.

The deployment mechanism 30 transitions the deployable reflectarray 20 between the undeployed and deployed states in two phases. In the first phase, the first and second flexible electrical elements 26, 28, which are in folded in the undeployed state, are positioned so that the elements can be unfolded and deployed so as to establish the primary and secondary reflectarrays 40, 42 and the necessary positional relationships with one another and the feed antenna 24 to establish the center-fed Cassegrain/Gregorian-style reflectarray antenna. The second phase involves the deployment of the first and second electrical elements 26, 28 so as to establish the primary and secondary reflectarrays 40, 42 and the positioning of the reflectarrays relative to the feed antenna 24 to establish the reflectarray antenna.

Generally, the deployment mechanism 30 includes a guide tube structure 110, a spring 112, a limit lanyard system 114, a primary housing 116, a base plate 118, a tape dispenser 120, and a secondary housing 122.

The guide tube structure 110 serves a number of purposes. To elaborate, the guide tube structure 110 directs the displacement of the primary housing 116 with the undeployed first flexible electrical element 26 supported by the housing, the base plate 118, the tape dispenser 120, the feed antenna 24, the secondary housing 122 with the undeployed second flexible electrical element 28 during the first phase of the transition of the deployable reflectarray 20 between the undeployed and deployed states. The guide tube structure 110 also operates so as to prevent the base plate 118, tape dispenser 120, feed antenna 24, and secondary housing 122 from rotating relative to the canister 122 during the transition and thereafter. Additionally, the guide tube structure 110 provides an axle about which the primary housing 116 can rotate during the second phase of the transition. The guide tube structure 110 also defines a portion of the passageway 60 that accommodates the coaxial cable or other signal transmission structure that is capable of providing electrical signals to and/or from the feed antenna 24.

The guide tube structure 110 includes a ridged cylindrical guide tube 130 with a first end 132 fixedly attached to the bottom surface 52 of the canister 22 and a free end 134. Additionally, the ridged cylindrical guide tube 130 defines a longitudinally extending ridge 136.

The guide tube structure also includes a slotted cylindrical guide tube 140 with a first end 142 fixedly attached to the base plate 118, a free end 144, and a slot 146 that is dimensioned to engage the ridge 136 associated with ridged cylindrical guide tube 130. The inner diameter of the slotted guide tube 140 (excluding the ridge 146) is slightly greater than the outer diameter of the ridged cylindrical guide tube 130. As such, the slotted guide tube 140 is capable of sliding over the ridged guide tube 130 when the tubes are oriented so that the slot 146 engages the ridge 136. In the first phase of the transition between the undeployed and deployed states, the slotted guide tube 140 can be extended away from the ridged guide tube 130 to direct the primary housing 116 and other elements outside of the canister 22. The "keying" of the slot 146 and the ridge 136 prevents rotation of the base plate 118 and other elements supported by the base plate during the transition and thereafter.

The spring 112 provides the energy for moving the primary housing 116 with the undeployed first flexible electrical element 26 supported by the primary housing, the base plate 118, the tape dispenser 120, the feed antenna 24, the second housing 122 with the undeployed second flexible electrical element 28 during the first phase of the transition of the deployable reflectarray 20 between the undeployed and deployed states. The spring 112 extends between the interior side of the bottom surface 52 of the canister and the primary housing 116. When the deployable reflectarray 20 is in the undeployed state with the first and second doors 62, 64 of the canister 22 closed, the spring 112 is compressed. After the first and second doors 62, 64 are opened, the potential energy stored in the spring 112 is released and a force is applied to the primary housing 116 with the undeployed first flexible electrical element 26 supported by the housing, the base plate 118, the tape dispenser 120, the feed antenna 24, the second housing 122 with the undeployed second flexible electrical element 28 as directed by the guide tube structure 110 so that these elements are positioned for the second phase of the transition between the undeployed and deployed states. In the illustrated embodiment, the spring 112 provides sufficient energy so that the primary housing 116 and the first flexible electrical element 26 and the secondary housing 122 and the second flexible electrical element 28 are sufficiently exposed for the second phase of the transition between the undeployed and deployed state. In this regard, the spring 112 provides sufficient energy to position the bottom of the primary housing 116 at or slightly above the edge of the canister 22 that is exposed following the opening of the first and second doors 62, 64.

The limit lanyard system 114 operates to limit the extent to which the spring 112 moves the primary housing 116 with the undeployed first flexible electrical element 26 supported by the housing, the base plate 118, the tape dispenser 120, the feed antenna 24, the second housing 122 with the undeployed second flexible electrical element 28 along the guide tube structure 110 during the first phase of the transition between the undeployed and deployed states. To elaborate, the spring 112 is designed to provide sufficient energy to move the noted elements to a desired position for the second phase of the transition. To ensure that the elements reach the desired position, the spring 112 is designed so as to be capable of providing more energy than is needed to position the elements at the desired position. As such, the spring 112 is potentially capable of moving the elements beyond the desired position. The limit lanyard system 114 prevents the spring 112 from moving the elements beyond the desired position. The limit lanyard system includes lanyards 150A-150D, each with one end connected to the bottom surface 52 of the canister 22 and the other end connect to the base plate 118. The length of each of the lanyards 150A-150D is chosen so that when the lanyard is fully extended due to the force being provided by the spring 112, the elements are at the desired position for the second phase of the transition.

The primary housing 116 serves to define, in combination with a portion of the canister 22, the space within which the first flexible electrical element 26 resides when in the undeployed state. The primary housing 116 also operates so as to rotate about the slotted cylindrical guide tube 140 during the second phase of the transition of the first flexible electrical element 26 between the undeployed and deployed states. The need for the primary housing 116 and the first flexible electrical element 26 to rotate during the second phase of the transition is necessitated by the manner in which the first flexible electrical element 26 is folded when in the undeployed state. The primary housing 116 also serves to provide a portion of the forces that are used to shape the first flexible electrical element 26 in the manner needed to realize the primary reflectarray 40.

The primary housing 116 includes a reel-like structure 160 that includes a lower wall 162, an upper wall 164 that is substantially parallel to the lower wall 162, and a hollow cylindrical core 166 that extends between the lower wall 162 and the upper wall 164. The upper wall 164 has an outer edge with four scalloped sections 168A-168D that are portions of channels that allow mechanical connections to be established between the tapes associated with the tape dispenser 120 and the first flexible electrical element 26 and lanyards that extend between the first and second electrical elements 26, 28. The hollow cylindrical core 166 has an inner diameter sufficient to receive the slotted cylindrical guide tube 140. The hollow cylindrical core 166 also defines upper and lower bearing seats 170A, 170B that respectively support roller bearings 172A, 172B. The bearings 172A, 172B extend between the hollow cylindrical core 166 and the slotted cylindrical guide tube 140 and facilitate the rotation of the housing 116 about slotted cylindrical guide tube 140 when the first flexible electrical element 26 is transitioned from the deployed state during the second phase of the transition. Clearance between the bearing 172A and the base plate 118 prevents the base plate 118 from inhibiting rotation of the primary housing 116. Also associated with the primary housing 116 are a series of tapped holes that are respectively engaged by screws 176A-176D that pass through holes in the first flexible electrical element 26 and are used to connect the primary housing 116 to the first flexible electrical element 26.

The base plate 118 serves as a support for the tape dispenser 120, feed antenna 24, secondary housing 122, and second flexible electrical element 28. The base plate 118 has an outer edge with four scalloped sections 180A-180D that correspond with the four scalloped sections 168A-168D to provide pathways for mechanical connections to be established between the tapes associated with the tape dispenser 120 and the first flexible electrical element 26 and lanyards that extend between the first and second electrical elements 26, 28. The base plate 118 also has an inner edge that defines a hole 182 that forms a portion of the pathway that accommodates a coaxial cable used to send electrical signals to and/or from the feed antenna 24.

The tape dispenser 120 provides a plurality of tapes (frequently referred to as carpenter tapes) that are used to: (a) deploy the first flexible electrical element 26 so as to establish the primary reflectarray 40, (b) deploy the second flexible electrical element 28 so as to establish the secondary reflectarray 42, and (c) position the primary and secondary reflectarrays 40, 42 relative to one another and to the feed antenna 24 in a center-fed Cassegrain/Gregorian-style reflectarray antenna configuration.

The tape dispenser 120 is comprised of a primary tape dispenser 190 that is used to dispense tapes that are used to deploy the first flexible electrical element 26 and a secondary tape dispenser 192 that is used to dispense tapes that are used to deploy the second flexible electrical element 28.

Figure 6:
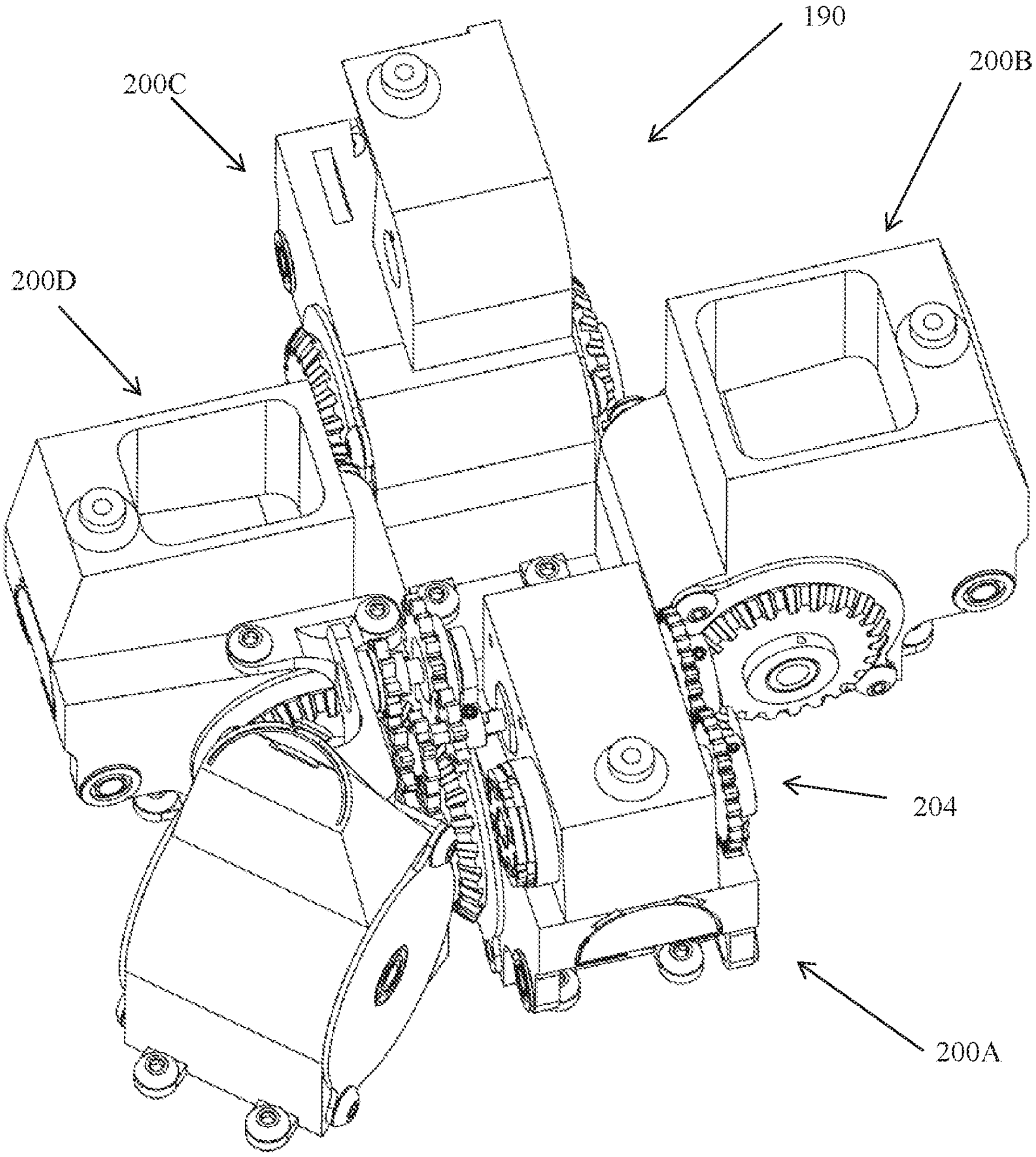
FIG. 6 is a perspective view of the primary tape dispenser for transitioning a flexible membrane from an undeployed state towards a deployed state in which the flexible membrane is configured for use as the reflectarray illustrated in FIGS. 4A and 4B.
Figure 7:
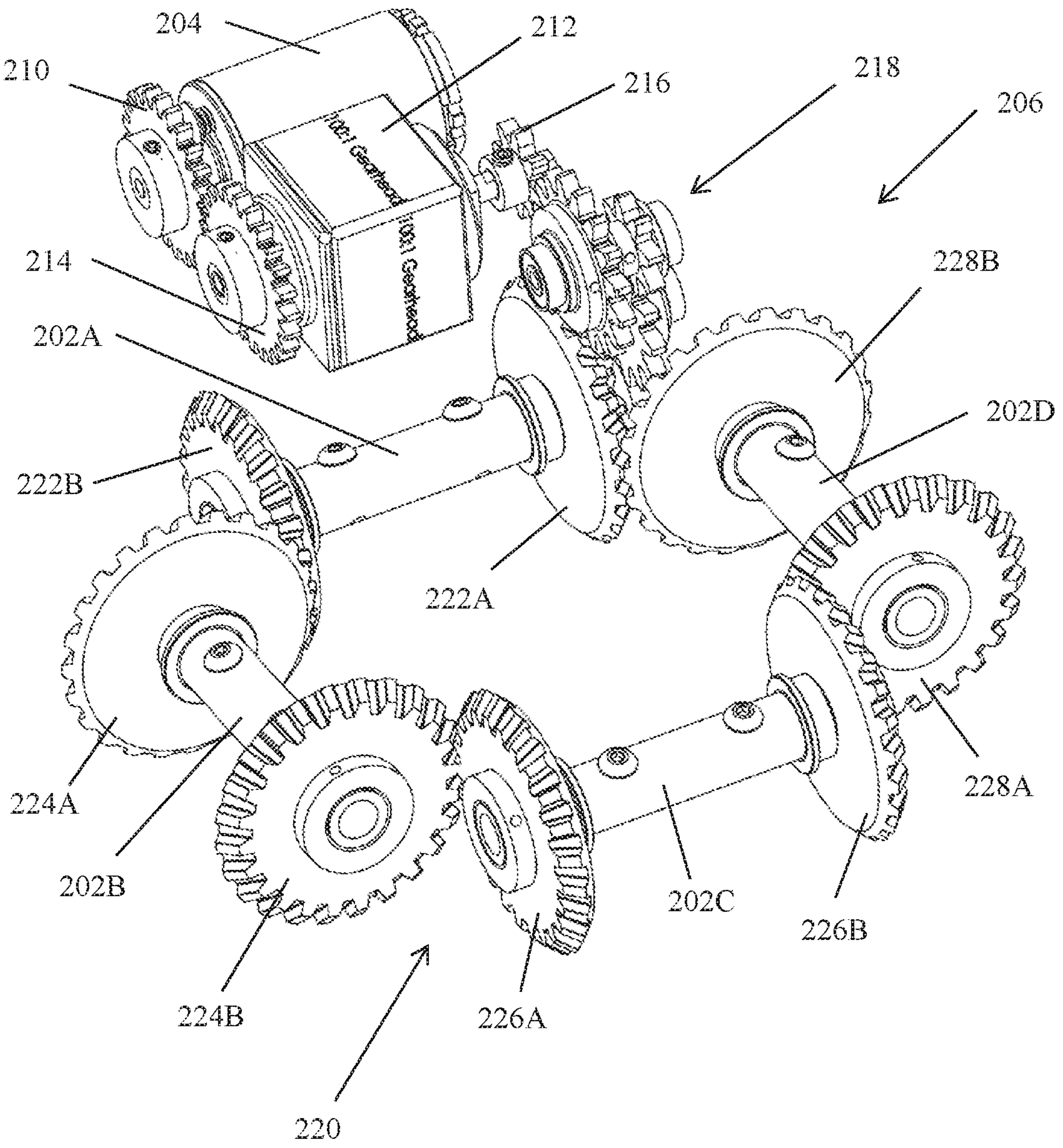
FIG. 7 is a perspective view of the motor and transmission system associated with the primary tape dispenser shown in FIG. 6.
Figure 8:
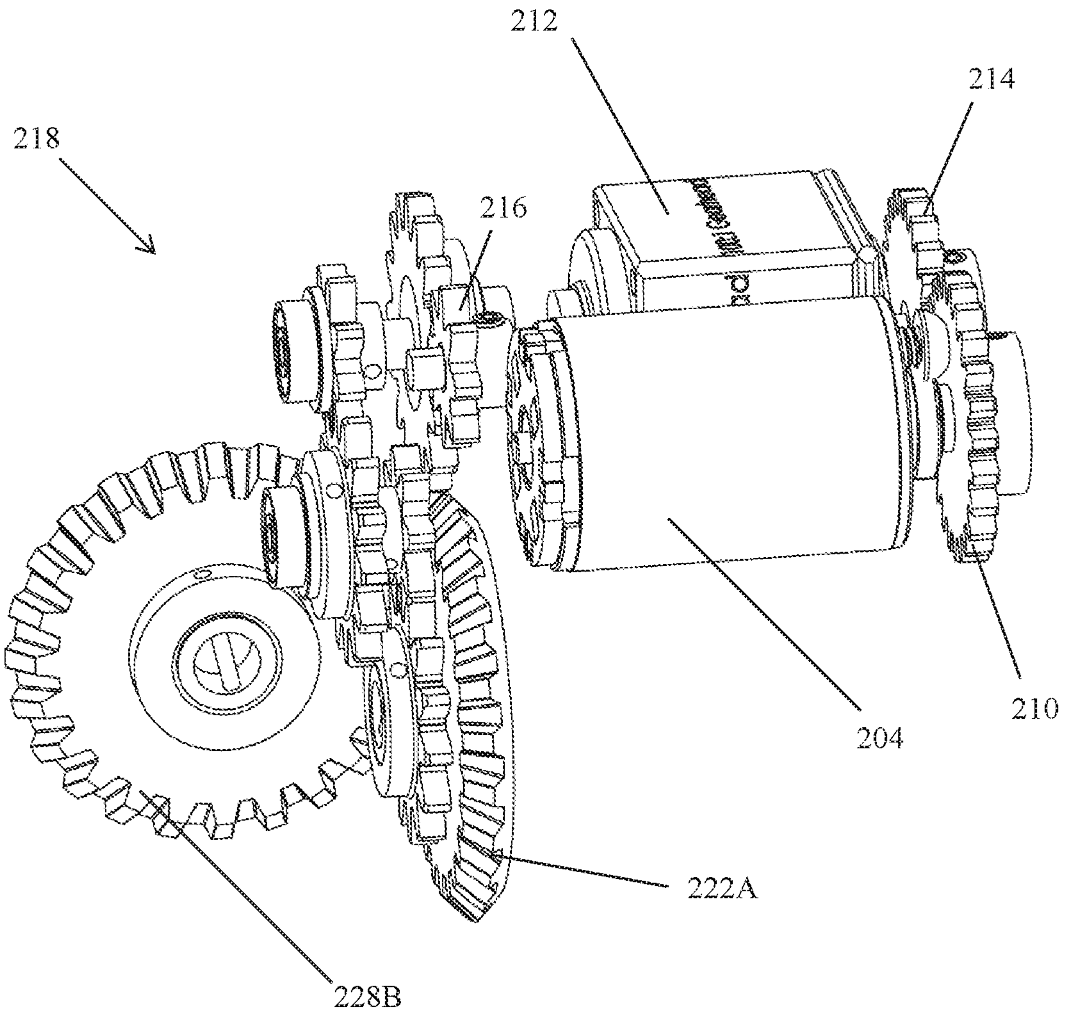
FIG. 8 is a perspective view of the motor and drive train associated with the primary tape dispenser shown in FIGS. 6 and 7.

With reference to FIGS. 6-8, the primary tape dispenser 190 operates to dispense four tapes that each engages the first flexible electrical element 26 at a point adjacent to one of the corners of the outer edge 86 of the element. The four tapes, when dispensed or deployed, cooperate with the screws 176A-176D that each engage the element at a point adjacent to the inner edge 88 to hold the flexible electrical element 26 in the pyramid-like shape of the primary reflectarray 40.

The primary tape dispenser 190 includes: (a) four individual tape dispensers 200A-200D that respectively have tape axles 202A-202D that are each adapted to support a roll of tape with one end of the tape operatively connected to the axle and the other end operatively connected to the first flexible electrical element 26, (b) an electric motor 204 for providing the force needed to drive the axles 202A-202D and thereby dispense the tapes from the dispensers, and (c) a transmission system 206 for transmitting force from the motor 204 to each of the axles 202A-202D to dispense the tapes and to dispense the tapes at substantially the same time and at substantially the same rate.

The transmission system 206 includes a motor gear 210 that is connected to the axle of the electric motor 204, a gearhead 212 with a first gearhead gear 214 that engages the motor gear 210 and a second gearhead gear 216 that the gearhead 212 causes to rotate at multiple times the rate at which first gearhead gear 214 is caused to rotate by the electric motor 204, a drive train 218 that is comprised of a number of gears that transfer the force produced by the second gearhead gear 216 to tape axle 202A, and a miter gear system that transfers the rotational force imparted to tape axle 202A to axles 202B-202D. The miter gear system includes a first pair of miter gears 222A, 222B associated with the axle 202A; a second pair of miter gears 224A, 224B associated with the axle 202B; a third pair of miter gears 226A, 226B associated with axle 202C; and a fourth pair of miter gears 228A, 228B associated with the axle 202D.

Figure 9:
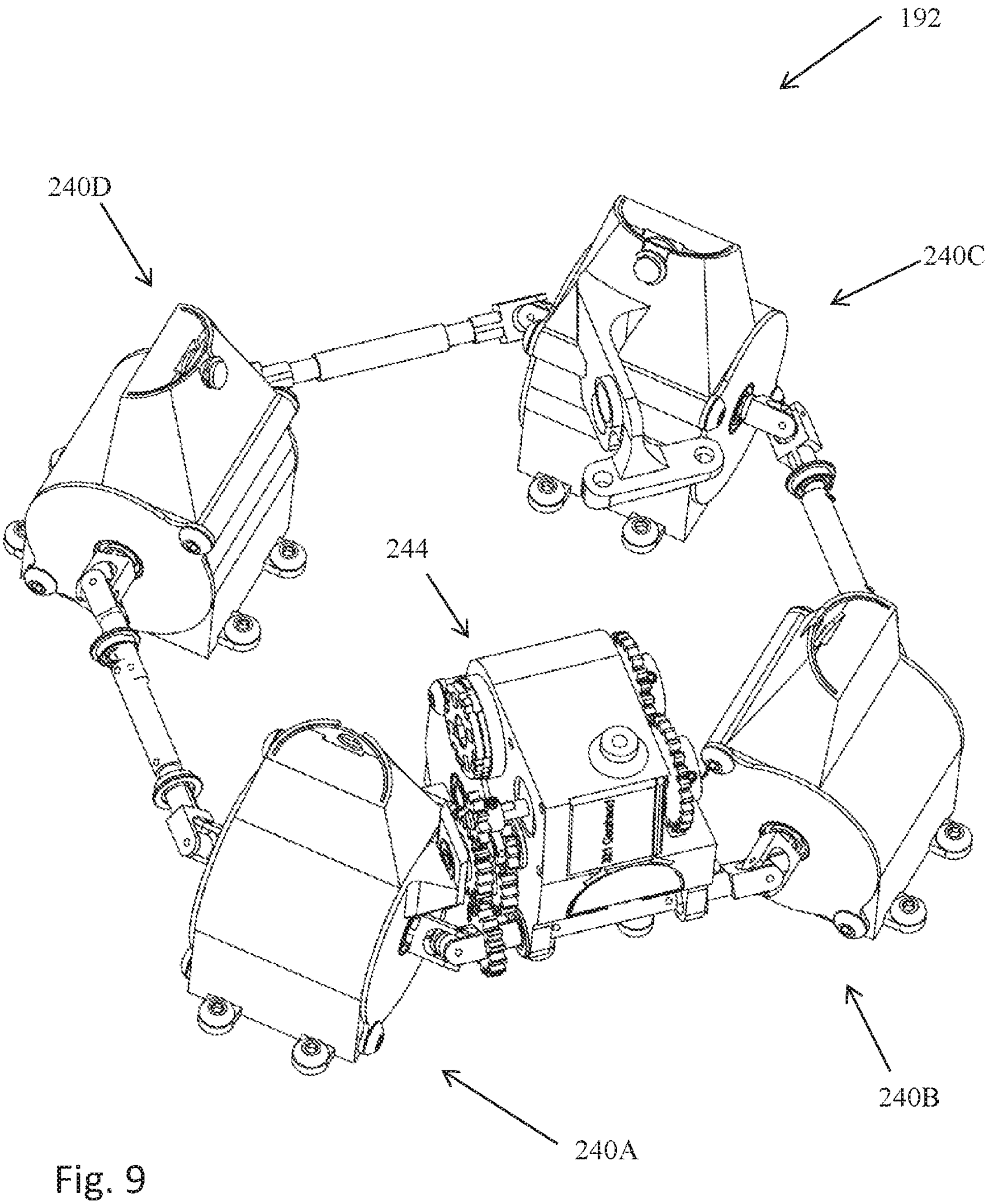
FIG. 9 is a perspective view of the secondary tape dispenser for transitioning a flexible membrane from an undeployed state towards a deployed state in which the flexible membrane is configured for use as the subreflector shown in FIG. 5.
Figure 10:
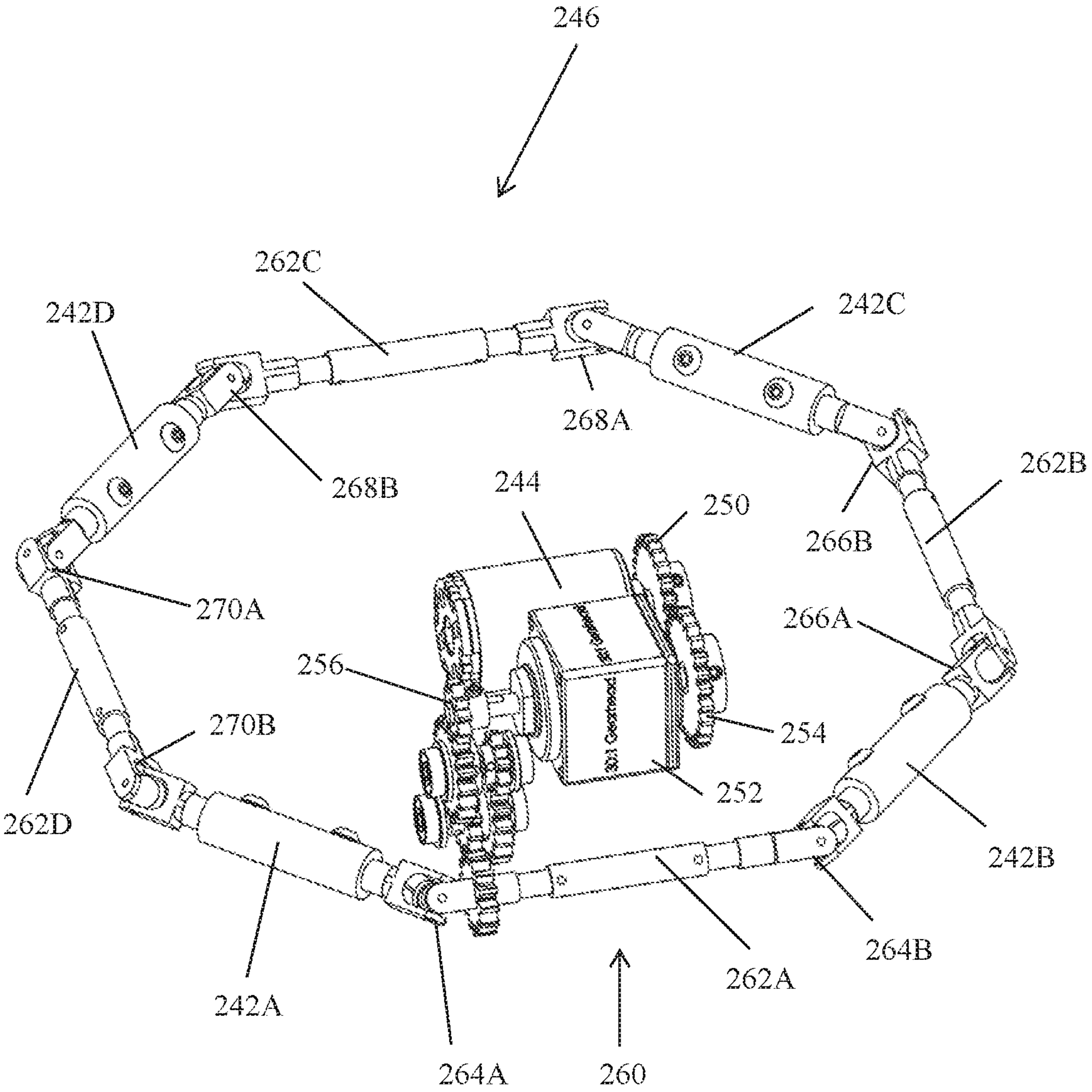
FIG. 10 is a perspective view of the motor and transmission system associated with the secondary tape dispenser shown in FIG. 9.
Figure 11:
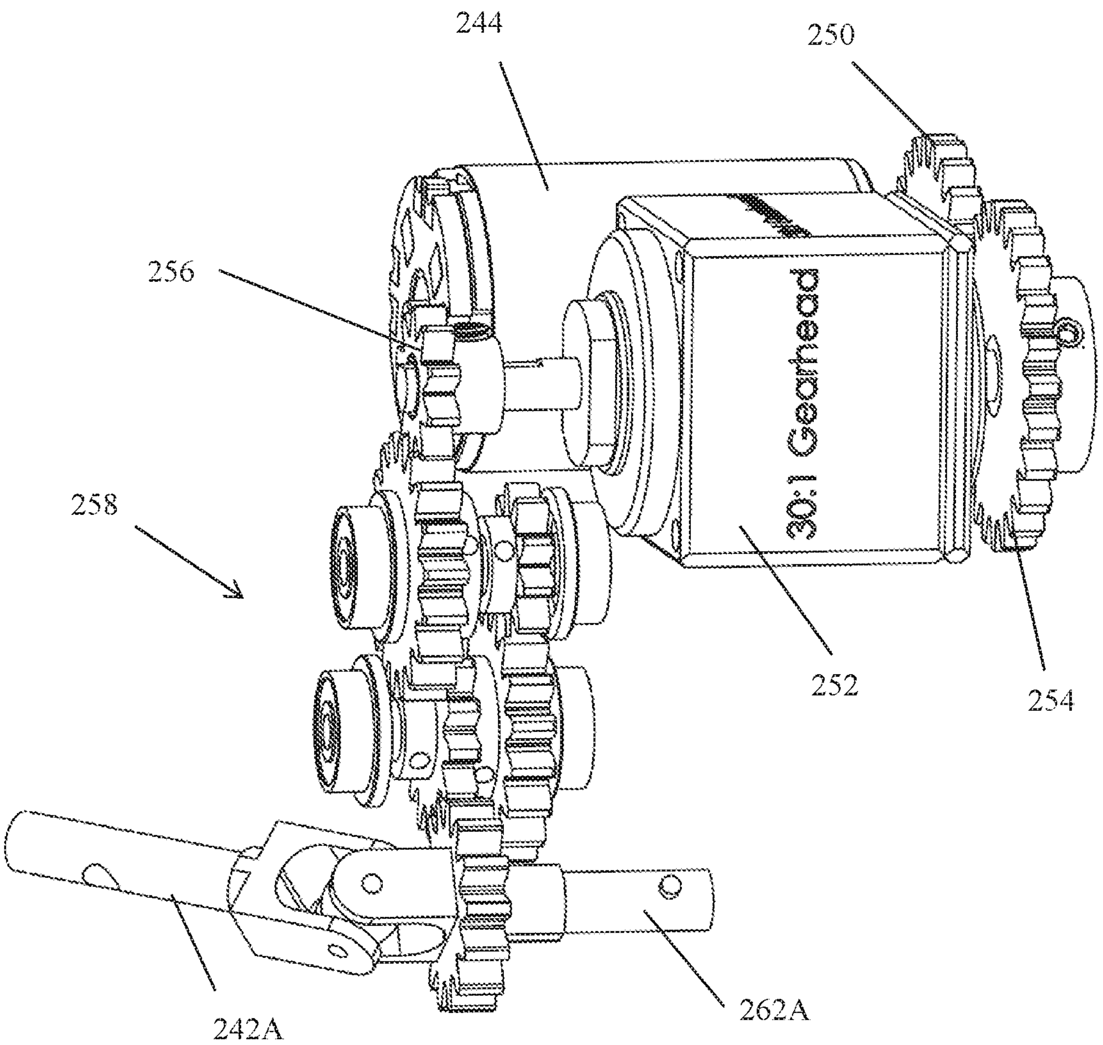
FIG. 11 is a perspective view of the motor and drive train associated with the secondary tape dispenser shown in FIGS. 9 and 10.
Figure 12:
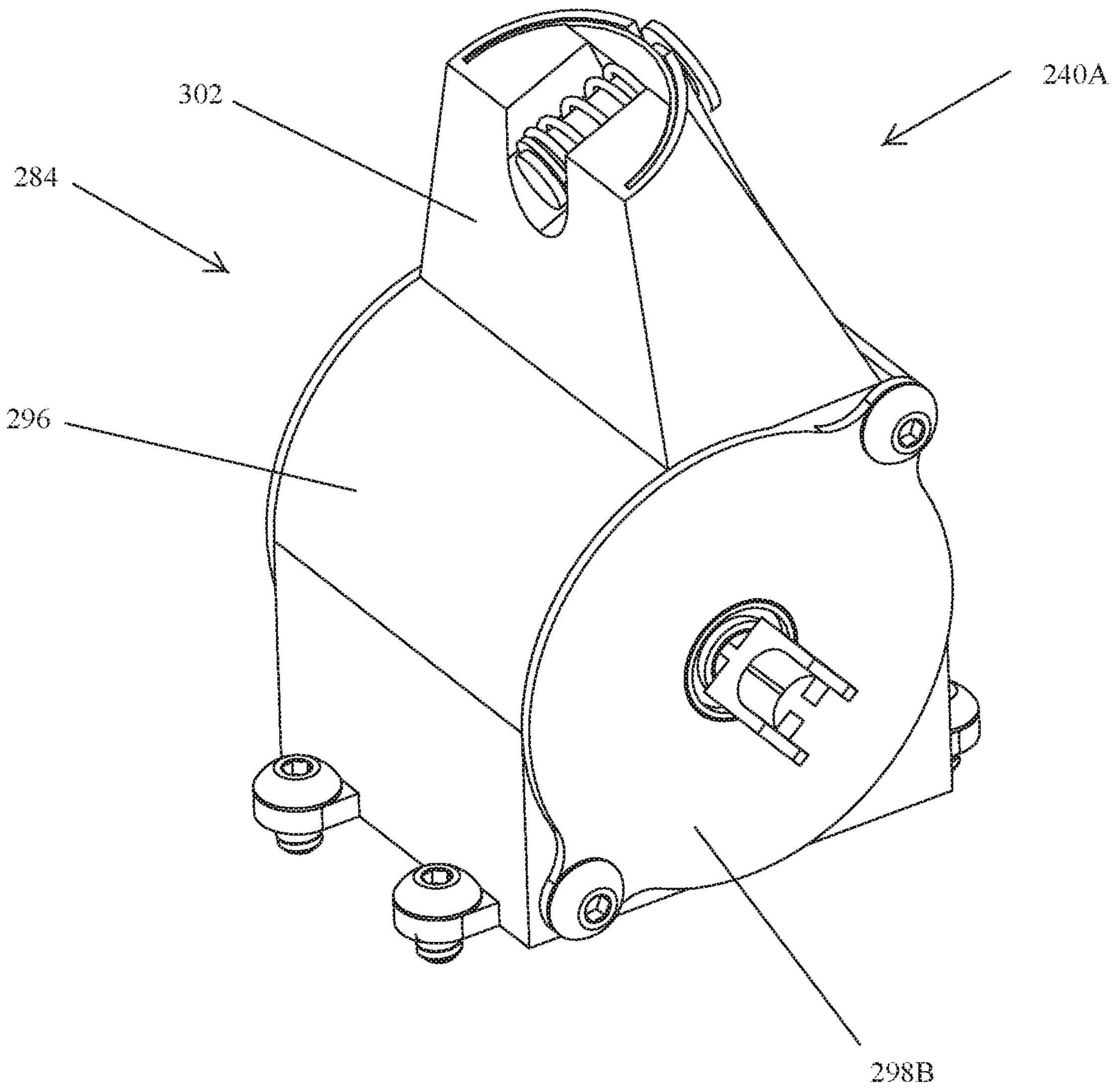
FIG. 12 is a perspective view of a tape cartridge or dispenser used in the secondary tape dispenser shown in FIGS. 9-11.
Figure 13:
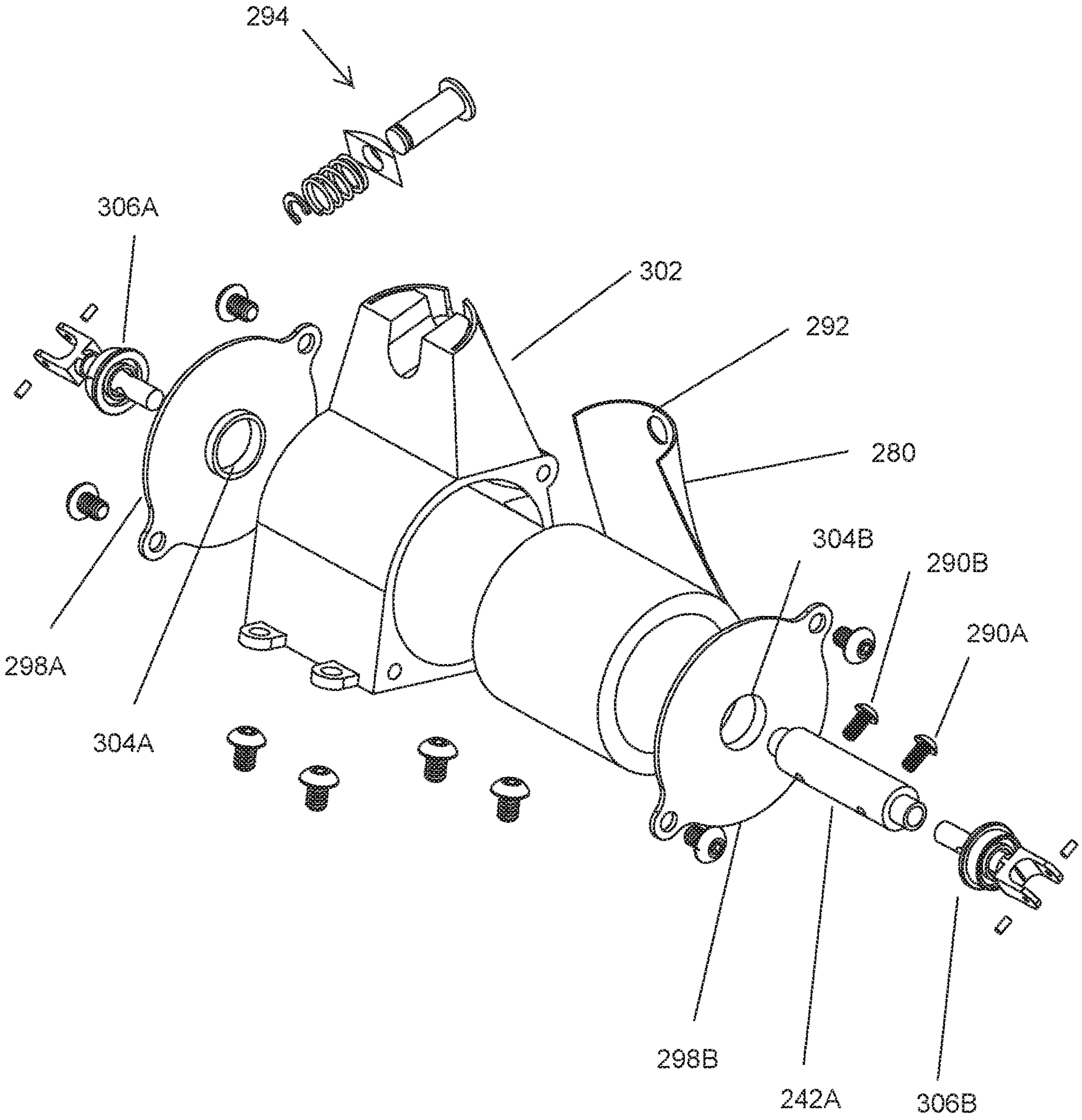
FIG. 13 is an exploded view of the tape dispenser shown in FIG. 12.
Figure 14:
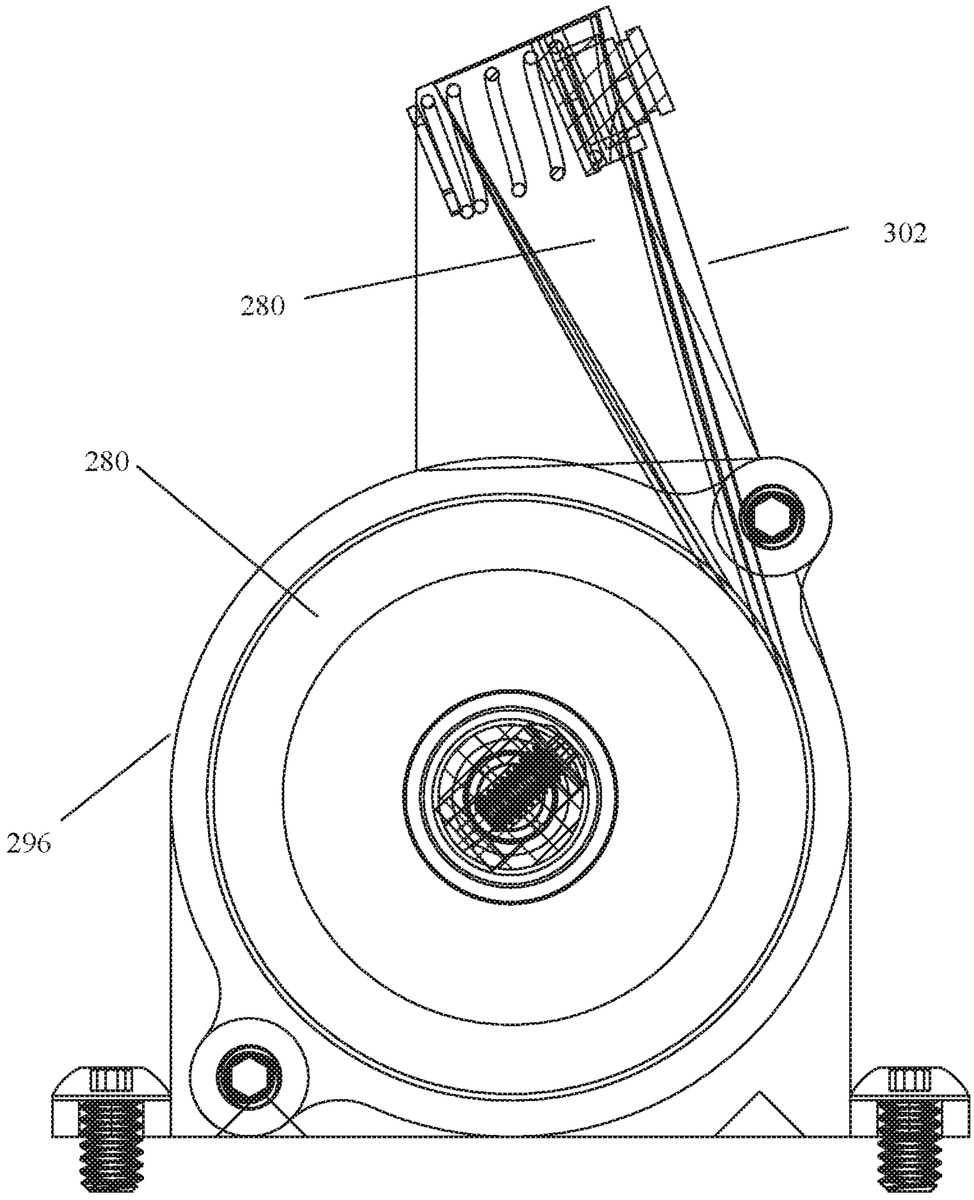
FIG. 14 is a cross-sectional view of the tape dispenser shown in FIG. 12.
Figure 15:
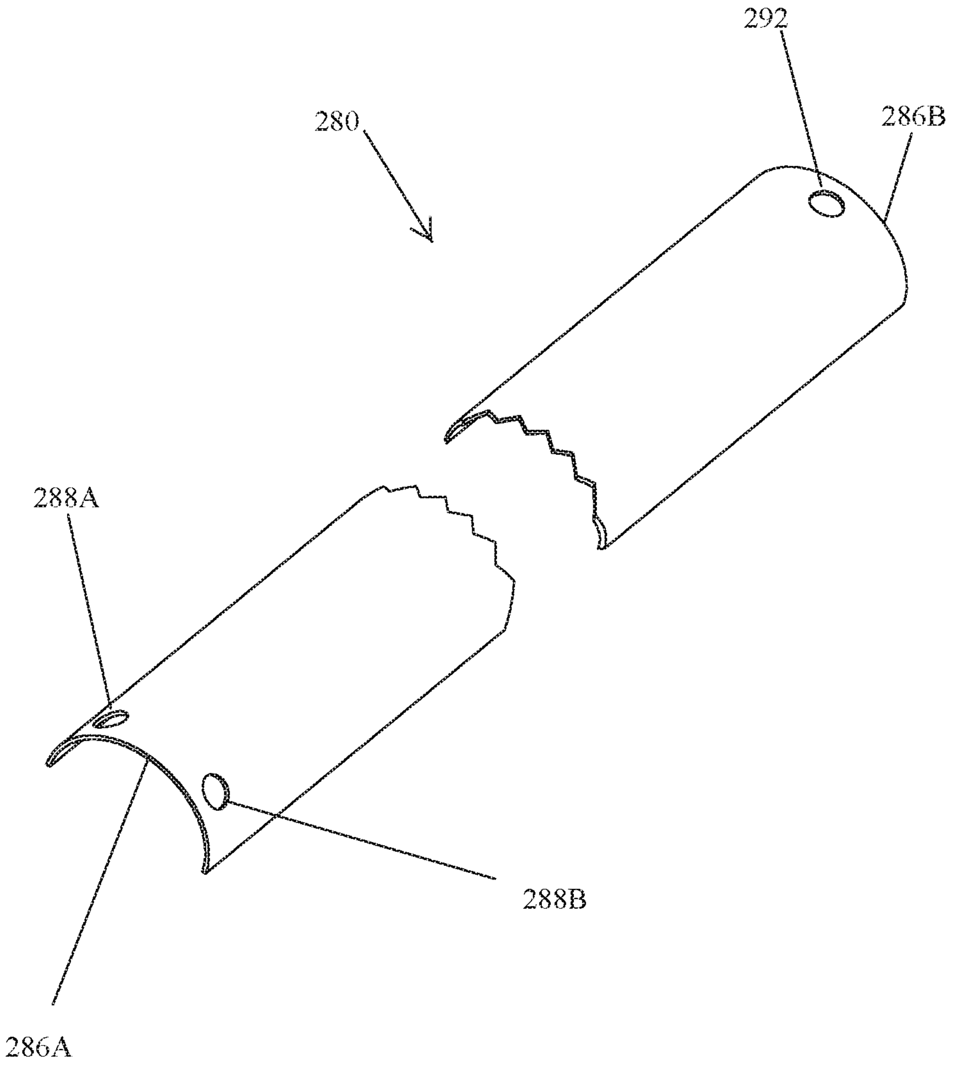
FIG. 15 illustrates the tape associated with the tape dispenser shown in FIG. 12 in its deployed state.

With reference to FIGS. 9-11, the secondary tape dispenser 192 operates to dispense four tapes that each engages the second flexible electrical element 28 at a point adjacent to one of the corners of the outer edge 96 of the element to hold the second flexible electrical element 28 in the flat shape of the secondary reflectarray 42.

The secondary tape dispenser 192 includes: (a) four individual tape dispensers 240A-240D that respectively have tape axles 242A-242D that are each adapted to support a roll of tape with one end of the tape operatively connected to the axle and the other end operatively connected to the second flexible electrical element 28, (b) a motor 244 for providing the force needed to drive the axles 242A-242D and thereby dispense the tapes from the dispensers, and (c) a transmission system 246 for transmitting force from the motor 244 to each of the axles 242A-242D to dispense the tapes and to dispense the tapes at substantially the same time and at substantially the same rate.

The transmission system 246 includes a motor gear 250 that is connected to the axle of the electric motor 244, a gearhead 252 with a first gearhead gear 254 that engages the motor gear 250 and a second gearhead gear 256 that the gearhead 252 causes to rotate at many times the rate at which first gearhead gear 254 is caused to rotate by the electric motor 244, a drive train 258 that is comprised of a number of gears that transfer the force produced by the second gearhead gear 256 to a connecting rod system 260 that, in turn, transfers the rotational force to axles 242A-242D. The connecting rod system 260 includes connecting rods 262A-262D, a first pair of U-joints 264A, 264B associated with connecting rod 262A and respectively engaging axles 242A, 242B, a second pair of U-joints 266A, 266B associated with connecting rod 262B and respectively engaging axles 242B, 242C, a third pair of U-joints 268A, 268B associated with connecting rod 262C and respectively engaging axles 242C, 242D, and a fourth pair of U-joints 270A, 270B associated with connecting rod 262D and respectively engaging axles 242D, 242A. The connecting rod system 260 operates to transfer the rotational force imparted by the drive train 258 to the connecting rod 262A to each of the axles 242A-242D.

With reference to FIGS. 12-15 tape cartridge or tape dispenser 240A of the secondary tape dispenser 192 is described with the understanding that tape dispensers 240B-240D are substantially identical. Further, the tape dispensers 200A-200D of the primary tape dispenser 190 are also substantially identical to the tape dispenser 240A with two exceptions, namely, (a) the tape dispensers 200A-200D dispense tape in a different direction than tape dispenser 240A and (b) the tape dispensers 200A-200D dispense a different length of tape than tape dispenser 240A. The tape dispenser 240A includes a bi-stable composite tape 280, the tape axle 242A, and housing 284. The bi-stable composite tape 280 has two stable states, namely, (1) a first state in which the tape has a coiled cylindrical shape and (2) a second state in which the tape extends in a linear fashion with a lateral cross-section that has an arc. The bi-stable composite tape 280 extends from a first end 286A to a second end 286B. The first end 286A defines a pair of holes 288A, 288B that are used to engage the tape to the tape axle 242A with a pair of screws 290A, 290B. The second end 286B defines a hole 292 that is used to engage a fastener 294 which is used in connecting the tape 280 to the second flexible electrical element 28. The housing 284 includes a main housing 296 and side panels 298A, 298B that engage the main housing. A substantial portion of the main housing 296 and the side panel 298A, 298B define a chamber 300 for holding, prior to deployment, the bulk of the tape 280 in the first state, i.e., in the coiled cylindrical shape. The housing 284 also includes a transition portion 302 that supports a short section of the tape 280 in a manner that transitions the short section of tape from the first state to the second state. The side panels 298A, 298B respectively define holes 304A, 304B that receive bearings 306A, 306B. The bearings 306A, 306B facilitate the rotation of the tape axle 242A within the main housing 296. Each of the bearings 306A, 306B also engages one half of a U-joint.

Figures 18A, 18B, 18C, 18D:
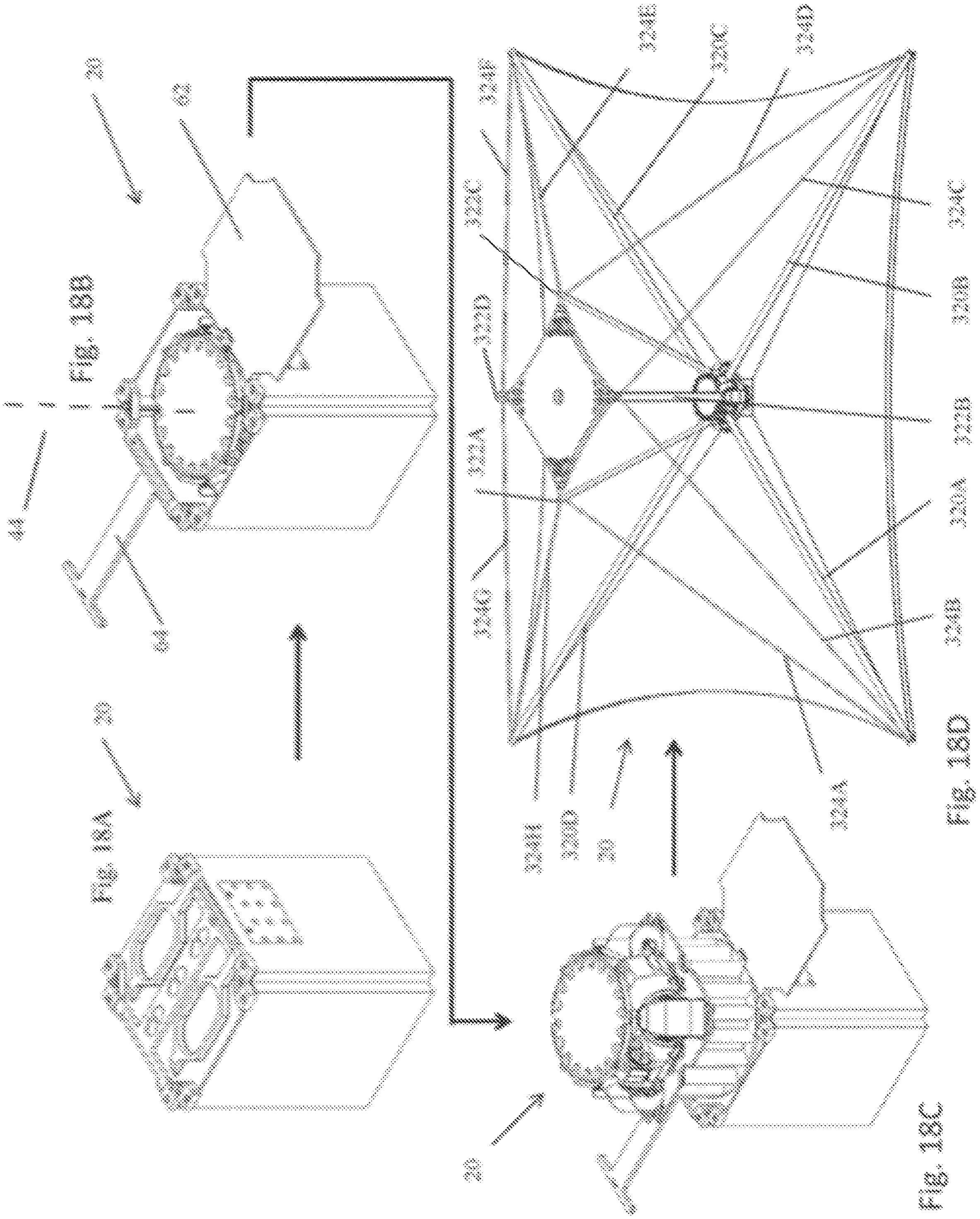
FIGS. 18A-18D illustrate the transition of the deployable reflectarray antenna structure shown in the foregoing figures from the undeployed state to the deployed state.

With reference to FIG. 18D, the primary tape dispenser 190 operates to synchronously dispense four tapes 320A-320D and the secondary tape dispenser 192 operates to synchronously dispense four tapes 322A-322D. Associated with the tapes 320A-320D and 322A-322D are lanyards 324A-324H with each lanyard extending between an end of one of the tapes 320A-320D and an end of one of the tapes 322A-322D. Each of the lanyards 324A-324D cooperates with the two tapes that it directly engages to facilitate the establishment of a truss structure that supports the primary and second reflectarrays 40, 42.

Figure 16:
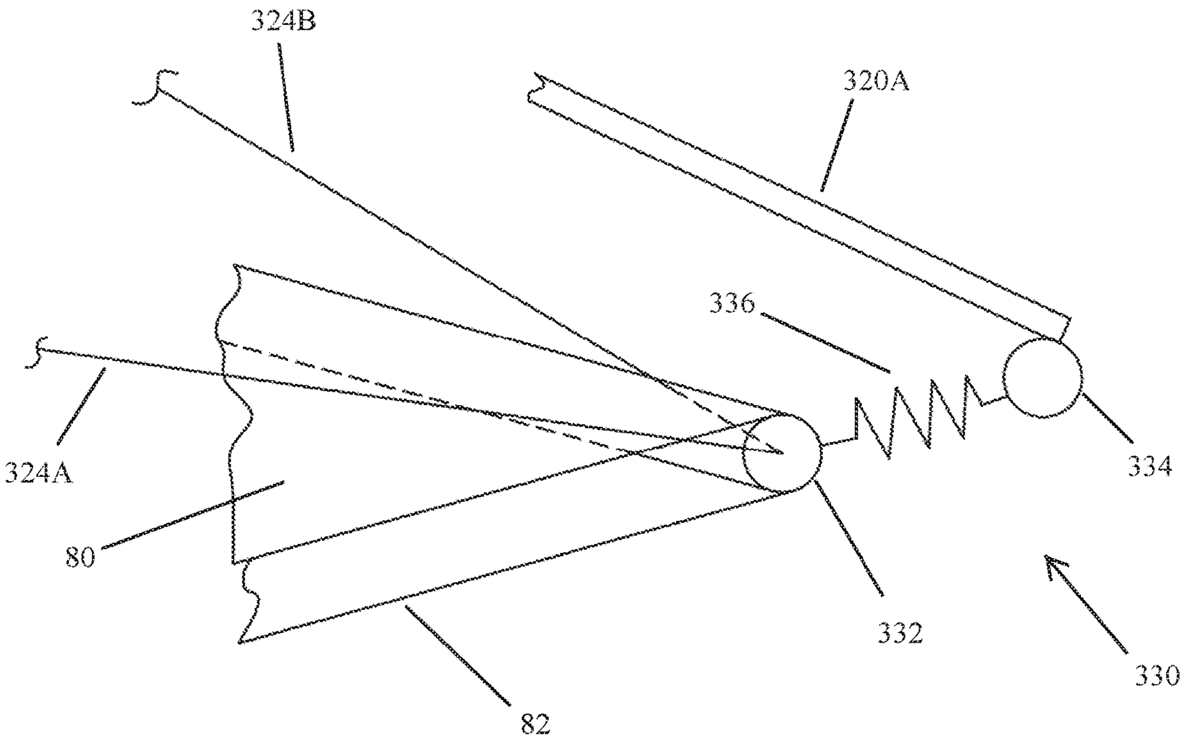
FIG. 16 illustrates the connection structure used to establish a connection between a membrane, a pair of lanyards, and a tape.

With reference to FIG. 16, a connection structure 330 is described that interconnects the first flexible electrical element 26, tape 320A, and lanyards 324A, 324B. The connection structure 330 is substantially identical to the connection structure associated with each of the tapes 320B-320D with the exception that each of these tapes engages a different pair of lanyards. Further, the connection structure 330 is substantially identical to the connection structure associated with each of the tapes 322A-322D with the exception that the connection structure associated with each of these tapes engages the second flexible electrical element 28, a different pair of lanyards, and does not include a spring. The connection structure 330 includes a first mount 332, second mount 334, and spring 336. The first mount 332 is operatively engaged to the first and second flexible membranes 80, 82 of the first flexible electrical element 26, one end of the lanyard 324A, one end of lanyard 324B, and one end of the spring 336. The second mount 334 operatively engages one end of the tape 320A and the other end of the spring 336. In operation, the spring 336 operates to keep forces applied to the first flexible electrical element 26 and the tape 320A relatively constant and thereby prevent the application of forces that could adversely affect the functionality of one or both of the element and the tape.

Figure 17A:
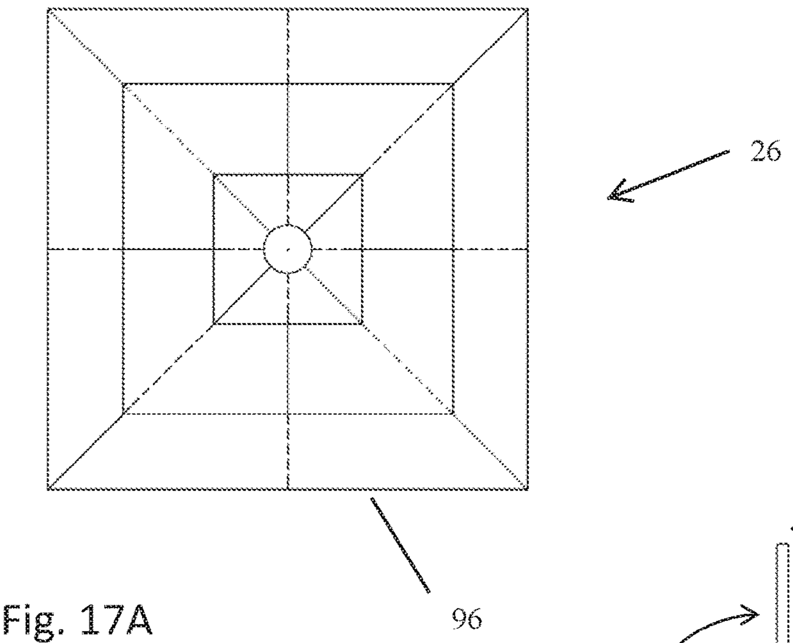
FIGS. 17A-17C illustrate the method of folding the first flexible electrical element to place in the element in an undeployed state.
Figure 17B:
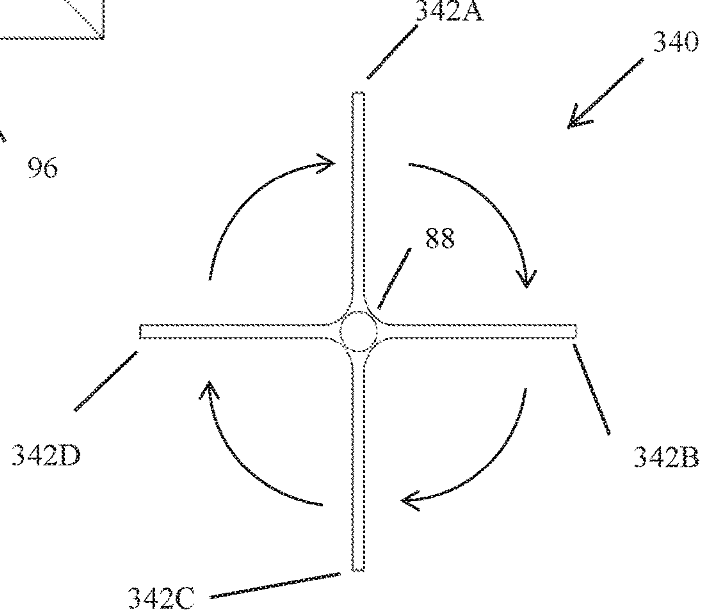
Figure 17C:
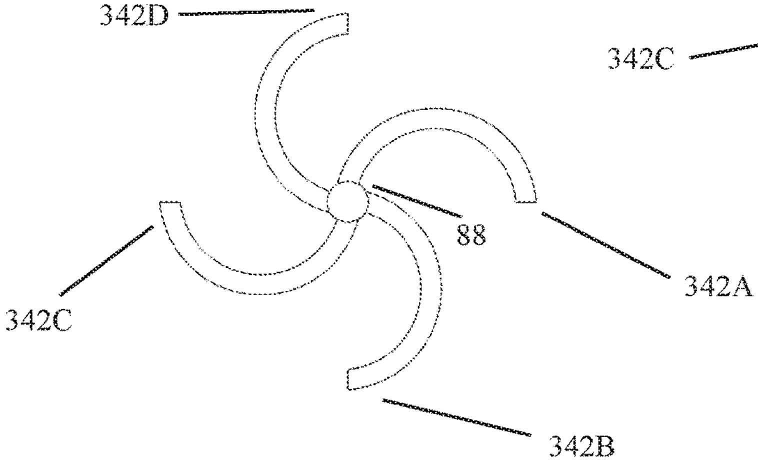

Before describing the operation of the deployable reflectarray 20, the manner in which the first flexible electrical element 26 is folded so as to be accommodated in the spaced defined by the primary housing 116 and a portion of the canister 22 when the deployable reflectarray 20 is in the undeployed state is described. With reference to FIG. 17A, the first flexible electrical element 26 initially is flat and the outer edge 96 substantially defines a square. Within the outer edge 96 folding lines are defined with the solid folding lines representing “ridges” and the dashed folding lines representing “valleys.” This particular pattern of folding is known as a “leaf-in” folding pattern. With reference to FIG. 17B, folding the first flexible electrical element 26 according to the leaf-in pattern produces a four-branch structure 340 with arms 342A-342D that each extend away from the inner edge 88 of the first flexible electrical element 26. With reference to FIG. 17C, the folding of the first flexible electrical element 26 is completed by swirling the arms 342A-342D around the inner edge 88 so as to form a multi-arm spiral pattern that, as the radius of the spirals decreases, ultimately has the overall shape of a hollow cylinder.

With reference to FIGS. 18A-18D, the operation of the deployable reflectarray 20 is described. Initially and as shown in FIG. 18A, the deployable reflectarray 20 is in an undeployed state with the door structure 54 of the canister 22 closed and the meltable pin 68 intact. The feed antenna 24, first flexible electrical element 26, second flexible electrical element 28, and deployment mechanism 30 are enclosed within the canister 22.

With reference to FIGS. 18B and 18C, the first phase of the deployment commences with an electrical signal being applied to the meltable pin 68 to cause the pin 68 to fail and the spring biased doors 62, 64 to open. Once the doors 62, 64 are sufficiently open the spring 112 can apply a force to the overlying components, namely, the feed antenna 24, first flexible electrical element 26, second flexible electrical element 28, primary housing 116, base plate 118, tape dispenser 120, and secondary housing 122 to move these components to a location from which the first and second flexible electrical elements 26, 28 can be deployed to realize the primary and secondary reflectarrays 40, 42 and to position the primary and secondary reflectarrays relative to one another and to the feed antenna 24 so as to realize a center-fed Cassegrain/Gregorian-style reflectarray antenna structure. In this regard, the spring 112 applies sufficient force to position the overlying components outside of the canister 22 and such that the lower wall 162 of the primary housing 116 extends slightly above the upper edge of the canister 22. The limit lanyards 150A-150D prevent the spring 112 from moving the overlying components beyond this point.

With reference to FIG. 18D, the second phase of the deployment of the first and second electrical elements 26, 28 is accomplished by applying electrical power to the electric motor 204 of the primary tape dispenser 190 and to the electric motor 244 of the secondary tape dispenser 192. Electric power can be simultaneously applied to the electric motors 204, 244. Alternatively, electric power can be sequentially applied to the electric motors 204, 244, i.e., electrical power being initially applied to electric motor 204 and subsequently applied to electric motor 244 or being initially applied to electric motor 244 and subsequently applied to electric motor 204. The source of the electrical power for the motors is typically a battery or solar array that is located outside of the deployable reflectarray 20. The electrical power is conveyed to the electrical motors 204, 244 via conductors disposed within the passageway 60.

Regardless of the manner in which electrical power is applied to the electrical motors 204, 244, the electric motor 204 and transmission 206 operate to simultaneously deploy tapes 320A-320D from the primary tape dispensers 200A-200D and in so doing establish the primary reflectarray 40. Due to the spiral folding of the first flexible electrical element 26, the dispensing of the primary tapes 320A-320D causes the primary housing 116 to rotate about the cylindrical guide tube 140. The electric motor 244 and transmission 246 also operate to simultaneously deploy tapes 322A-322D from the secondary tape dispenser 240A-240D and in so doing establish the secondary reflectarray 42. The deployment of the tapes 320A-320D and 322A-322D also deploys the lanyards 324A-324H. It should be appreciated that the electric motors 204, 244 are capable of being used so as to control the rate at which the tapes 320A-320D and 322A-322D are deployed. As such, the electric motors 204, 244 each function, at least in part, as dampers.

There are a number of features to note about the tapes 320A-320D and 322A-322D and/or the lanyards 324A-324H in the deployed state. First, each of the tapes is substantially located between the first flexible electrical element 26 and a plane defined by the second flexible electrical element 28. However, because the tapes are made of a composite material (e.g., fiberglass and an epoxy), the tapes act as a dielectric and have little, if any, effect on the electromagnetic waves that travel between the primary and secondary reflectarrays 40, 42 during operation of the antenna. Second, the deployed tapes 320A-320D apply sufficient force to the first flexible electrical element 26 so that a catenary is established between each of the corners of the outer edge 86. This, in turn, results in the first flexible electrical element 26 being deployed so as to have a relatively smooth surface that is substantially free of wrinkles that could adversely affect the performance of the deployed element. Third, the deployed tapes 320A-320D cause the first flexible electrical element 26 to have a shape that is pyramid-like and, more specifically, a frustum of a pyramid-like structure with the corners of the edge 86 of the element defining the base of the pyramid-like structure, the inner edge 88 of the element defining flattened apex of the pyramid-like structure, and the seams between the corners of the edge 86 and the inner edge 88 defining the edges of the pyramid-like structure. It is believed that the pyramid-like structure of the deployed first flexible electrical element 26 improves the bandwidth of the antenna. Fourth, the deployed tapes 320A-320D also define a pyramid-like shape with the outer ends 286B of the tapes defining the base of the pyramid-like structure, the inner ends 286A of the tapes defining the flattened apex of the pyramid-like structure, and the tapes defining the edges of the pyramid-like structure. However, in certain embodiments the deployed tapes 320A-320D lie substantially in a plane. Fifth, each of the deployed tapes 320A-320D is in compression due to the force applied to the first end 286A of the tape by the tape axle to which the tape is connected and the force applied to the second end 286B of the tape by one of the connection structure 330, two of the lanyards, and the first flexible electrical element 26. Sixth, the two lanyards and the first flexible electrical element 26 also cooperate to substantially limit any bending moment being applied to each of the deployed tapes 320A-320D. Seventh, the deployed tapes 322A-322D and the lanyards 324A-324H apply sufficient force to the second flexible electrical element 28 so that a catenary is established between each of the corners of the outer edge 96. This, in turn, results in the second flexible electrical element 28 being deployed so as to have a relatively smooth surface that is substantially free of wrinkles that could adversely affect the performance of the deployed element. Eighth, the deployed tapes 322A-322D and the lanyards 324A-324H also apply sufficient force to the second flexible electrical element 28 so that the element is substantially planar. Ninth, the deployed tapes 322A-322D also define a pyramid-like shape with the outer ends 286B of the tapes defining the base of the pyramid-like structure, the inner ends 286A of the tapes defining the flattened apex of the pyramid-like structure, and the tapes defining the edges of the pyramid-like structure. In certain embodiment, the deployed tapes 322A-322D can be substantially parallel to one another. In this case, the deployed tapes 322A-322D define a column-like structure with a polygonal cross-section. Tenth, four combinations of: (a) the deployed tapes 320A-320D, (b) the deployed tapes 322A-322D, and (c) the lanyards 324A-324H each form a first tetrahedron truss structure. For example, the combination of the deployed tape 320A, deployed tapes 322A and 322B, and lanyards 324A and 324B define one of the four first tetrahedron truss structures. Eleventh, four combinations of: (a) the deployed tapes 320A-320D, (b) the deployed tapes 322A-322D, and (c) the lanyards 324A-324H each form a second tetrahedron truss structure. For example, the combination of the deployed tapes 320A and 320B, deployed tape 322B, and lanyards 324B and 324C define one of the four second tetrahedron truss structures. Twelfth, four combinations of: (a) the deployed tapes 320A-320D, (b) the deployed tapes 322A-322D, and (c) the lanyards 324A-324H each substantially form a queens post-like truss structure. For example, the deployed tapes 320A and 320C with the base plate 118 define a tie beam of a queens post-like truss structure, deployed tapes 322B and 322C each define a queens post of a queens post-like truss structure, lanyards 324B and 324E each define a principle of a queens post-like truss structure, and the second flexible electrical element 28 defines the strain beam of a queens post-like truss structure.

While the deployable reflectarray 20 operates to implement a center-fed Cassegrain/Gregorian-like reflectarray antenna (i.e., a dual-reflector configuration), it should be appreciated that a deployable single-reflector configuration comprised of a reflectarray and a feed antenna is also feasible. In such a configuration, there would be no second flexible electrical element to deploy. Rather, the secondary tape dispenser would be adapted to deploy a feed antenna at a specific distance from a primary reflectarray (which, in such an embodiment, is the only reflectarray in the antenna). It should also be appreciated that tape deployment of one or more reflectarray antenna elements can be implemented for offset-fed Cassegrain/Gregorian-like reflectarray antennas, i.e., dual-reflector configurations in which the feed antenna, reflectarray, and subreflector are not aligned. Similarly, tape deployment of one or more reflectarray antenna elements can be implemented for an offset single-reflector configuration in which the feed antenna and reflectarray are not aligned, i.e., a normal to the surface of the reflectarray or the boresight of the reflectarray is not aligned with the boresight of the feed antenna.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable antenna structure comprising:

a first electrical element including antenna membrane, wherein the first electrical element is flexible;

a second electrical element;

a plurality of composite supports dispensable from a rolled format in an undeployed state into a linear format in a deployed state; and a deployment mechanism coupled to the composite supports, the deployment mechanism being configured to transition the first electrical element and the second electrical element from the undeployed state at the deployment mechanism towards the deployed state, wherein, at least the first electrical element is folded in the undeployed state and is unfolded in the deployed state to form an unfolded perimeter of the first electrical element, the unfolded perimeter of the first electrical element is extended away from the deployment mechanism by the composite supports in the deployed state, and the first electrical element is anchored to the deployment mechanism by the composite supports in the deployed state, wherein the second electrical element is flexible and is coupled to the composite supports.

2. The deployable antenna structure of claim 1, wherein the deployment mechanism is positioned between the first electrical element and the second electrical element in the deployed state.

3. The deployable antenna structure of claim 1, wherein the second electrical element is a feed antenna.

4. The deployable antenna structure of claim 1, wherein the second electrical element is folded in the undeployed state and is unfolded in the deployed state.

5. The deployable antenna structure of claim 1, wherein the second electrical element is folded in the undeployed state and is unfolded in the deployed state to form an unfolded perimeter of the second electrical element, the unfolded perimeter of the second electrical element is extended away from the deployment mechanism by the composite supports in the deployed state, and the second electrical element is anchored to the deployment mechanism by the composite supports in the deployed state.

6. The deployable antenna structure of claim 1, wherein the second electrical element is a subreflector.

7. The deployable antenna structure of claim 1, further comprising:

a third electrical element, wherein the first electrical element is a reflectarray, the second electrical element is a subreflector, and the third electrical element is a feed antenna.

8. The deployable antenna structure of claim 1, further comprising:

a third electrical element, wherein the first electrical element is a reflectarray, the second electrical element is a subreflector, the third electrical element is a feed antenna, and the feed antenna is positioned between the reflectarray and the subreflector in the deployed state.

9. The deployable antenna structure of claim 1, further comprising:

a third electrical element, wherein the first electrical element is a reflectarray, the second electrical element is a subreflector, the third electrical element is a feed antenna, and the deployment mechanism is positioned between the reflectarray and the feed antenna in the deployed state.

10. The deployable antenna structure of claim 1, further comprising:

a third electrical element, wherein the first electrical element is a reflectarray, the second electrical element is a subreflector, the third electrical element is a feed antenna, and the deployment mechanism is positioned between the reflectarray and the subreflector in the deployed state.

11. The deployable antenna structure of claim 1, further comprising:

a third electrical element, wherein the first electrical element is a reflectarray, the second electrical element is a subreflector, the third electrical element is a feed antenna, and the feed antenna is positioned between the deployment mechanism and the subreflector in the deployed state.

12. The deployable antenna structure of claim 1, further comprising:

a cannister, wherein the first electrical element is folded inside the cannister in the undeployed state and unfolded outside the cannister in the deployed state.

13. The deployable antenna structure of claim 12, wherein the second electrical element is flexible, folded inside the cannister in the undeployed state, and unfolded outside the cannister in the deployed state.

14. The deployable antenna structure of claim 1, further comprising:

a cannister, wherein the deployment mechanism is stowed inside the cannister in the undeployed state.

15. The deployable antenna structure of claim 1, wherein the first electrical element includes the antenna membrane and at least one additional antenna membrane.

16. The deployable antenna structure of claim 1, wherein the plurality of composite supports includes a plurality of composite tapes.

* * * * *